United States Patent
Toyoda

(10) Patent No.: US 10,218,919 B2
(45) Date of Patent: Feb. 26, 2019

(54) IMAGE PICKUP SYSTEM, IMAGE PROCESSING METHOD, AND RECORDING MEDIUM

(71) Applicant: OLYMPUS CORPORATION, Hachioji-shi, Tokyo (JP)

(72) Inventor: Tetsuya Toyoda, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/855,782

(22) Filed: Dec. 27, 2017

(65) Prior Publication Data

US 2018/0139395 A1 May 17, 2018

Related U.S. Application Data

(63) Continuation of application No. PCT/JP2016/053025, filed on Feb. 2, 2016.

(30) Foreign Application Priority Data

Sep. 11, 2015 (JP) .................................. 2015-179940

(51) Int. Cl.
*H04N 5/262* (2006.01)
*H04N 5/232* (2006.01)
(Continued)

(52) U.S. Cl.
CPC ............. *H04N 5/2628* (2013.01); *G03B 5/00* (2013.01); *G03B 17/14* (2013.01); *G06T 3/40* (2013.01);
(Continued)

(58) Field of Classification Search
CPC .. H04N 1/00469; H04N 1/3875; H04N 1/393; H04N 3/1562; H04N 5/23296; H04N 5/2628; H04N 5/3454
See application file for complete search history.

(56) References Cited

U.S. PATENT DOCUMENTS

2001/0048474 A1* 12/2001 Yamazaki .......... H04N 5/23212
348/207.99
2008/0122951 A1 5/2008 Yamamoto

FOREIGN PATENT DOCUMENTS

| JP | 02-007678 A | 1/1990 |
|----|-------------|--------|
| JP | 2008-141239 A | 6/2008 |
| JP | 2009-282551 A | 12/2009 |

OTHER PUBLICATIONS

International Search Report issued in corresponding International Patent Application No. PCT/JP2016/053025 dated Apr. 19, 2016, consisting of 3 pp. (English Translation Provided).

\* cited by examiner

*Primary Examiner* — Paul M Berardesca

(74) *Attorney, Agent, or Firm* — Volpe and Koenig, P.C.

(57) ABSTRACT

An image pickup system includes an image pickup section configured to pick up an optical image formed by an interchangeable lens and output picked-up image data having a predetermined sampling frequency, a super-resolution synthesizing section and a resizing section configured to generate image data having higher resolution from picked-up image data corresponding to a partial region in a screen, and a control section configured to determine, on the basis of an MTF characteristic value corresponding to the partial region among a plurality of MTF characteristic values and the predetermined sampling frequency, an upper limit of the resolution of the generated image data.

10 Claims, 18 Drawing Sheets

(51) Int. Cl.
    *H04N 5/349*       (2011.01)
    *H04N 5/238*       (2006.01)
    *G06T 3/40*         (2006.01)
    *G03B 5/00*         (2006.01)
    *G03B 17/14*       (2006.01)
    *G02B 7/14*         (2006.01)

(52) U.S. Cl.
    CPC ............ *G06T 3/4053* (2013.01); *H04N 5/232* (2013.01); *H04N 5/238* (2013.01); *H04N 5/23222* (2013.01); *H04N 5/23296* (2013.01); *H04N 5/232939* (2018.08); *H04N 5/349* (2013.01); *G02B 7/14* (2013.01)

| REGION | 60 LINE PAIRS (LP)/mm | 120 LINE PAIRS (LP)/mm | 240 LINE PAIRS (LP)/mm |
|---|---|---|---|
| A1 | 80 | 60 | 45 |
| A2 | 70 | 50 | 30 |
| A3 | 60 | 40 | 15 |
| A4 | 40 | 20 | 10 |

FIG. 4

| Gr | R  | Gr | R  |
|----|----|----|----|
| B  | Gb | B  | Gb |
| Gr | R  | Gr | R  |
| B  | Gb | B  | Gb |

FIG. 5

| P1 | P2 | P1 | P2 |
|----|----|----|----|
| P4 | P3 | P4 | P3 |
| P1 | P2 | P1 | P2 |
| P4 | P3 | P4 | P3 |

FIG. 6

| P3 | P4 | P3 | P4 |
|----|----|----|----|
| P2 | P1 | P2 | P1 |
| P3 | P4 | P3 | P4 |
| P2 | P1 | P2 | P1 |

FIG. 7

| P2 | P1 | P2 | P1 |
|----|----|----|----|
| P3 | P4 | P3 | P4 |
| P2 | P1 | P2 | P1 |
| P3 | P4 | P3 | P4 |

FIG. 8

| P4 | P3 | P4 | P3 |
|----|----|----|----|
| P1 | P2 | P1 | P2 |
| P4 | P3 | P4 | P3 |
| P1 | P2 | P1 | P2 |

FIG. 9

| AREA | ANGLE OF VIEW | MAGNIFICATION |
|---|---|---|
| A1+A2+A3+A4 | 100% | 1.0 |
| A1+A2+A3 | 75% | 1.3 |
| A1+A2 | 50% | 2.0 |
| A1 | 25% | 4.0 |

IMAGE PICKUP SYSTEM, IMAGE PROCESSING METHOD, AND RECORDING MEDIUM

CROSS REFERENCE TO RELATED APPLICATION

This application is a continuation application of PCT/JP2016/053025 filed on Feb. 2, 2016 and claims benefit of Japanese Application No. 2015-179940 filed in Japan on Sep. 11, 2015, the entire contents of which are incorporated herein by this reference.

BACKGROUND OF INVENTION

1. Field of the Invention

The present invention relates to an image pickup system in which an interchangeable lens is detachably attached to a camera main body, an image processing method for processing picked-up image data obtained from the image pickup system, and a recording medium that records an image processing program for executing the image processing method.

2. Description of the Related Art

Some interchangeable lenses attached to and detached from a camera main body have various optical characteristics. Therefore, a technique for giving MTF (modulation transfer function) characteristic data concerning resolving power of an optical system to the interchangeable lens, receiving the MTF characteristic data from the interchangeable lens on the camera main body side, and controlling functions of a camera related to the resolving power on the basis of the received MTF characteristic data has been proposed.

For example, Japanese Patent Application Laid-Open Publication No. 2009-282551 describes a technique for receiving MTF characteristic data from an interchangeable lens, setting a use limit F value of occurrence of small aperture diffraction on the basis of the received MTF characteristic data and pixel pitch information of an image pickup device, and avoiding a decrease in resolution due to excessive stop-down. The MTF characteristic data used in the publication is an average MTF characteristic value of an entire screen subjected to image pickup or an MTF characteristic value of representative one point in the entire screen.

Incidentally, digital zoom for enlarging, with pixel interpolation, a partial image, which is a partial region of an image obtained from an image pickup plane has been known.

In addition, a pixel-shift super-resolution technique for, while differentiating relative positions of an optical image formed by a lens and an image pickup device (at a non-integer pixel pitch such as a half pixel pitch, a one third pixel pitch) in an image pickup plane, acquiring a plurality of images and synthesizing one high-definition image on the basis of the acquired plurality of images has been known.

SUMMARY OF THE INVENTION

An image pickup system according to an aspect of the present invention is an image pickup system in which an interchangeable lens is detachably attached to a camera main body, the image pickup system including: an image pickup section provided in the camera main body and configured to pick up, on an image pickup plane on which a plurality of pixels are arrayed, an optical image formed by the interchangeable lens and output picked-up image data having a predetermined sampling frequency; a resolution changing section configured to generate, on the basis of the picked-up image data corresponding to a partial region in a screen obtained from the image pickup section, image data having resolution higher than resolution of the picked-up image data; and a control section configured to determine, on the basis of an MTF characteristic value corresponding to the partial region among a plurality of MTF characteristic values corresponding to a plurality of regions in the screen of the interchangeable lens and the predetermined sampling frequency, an upper limit of the resolution of the image data generated by the resolution changing section.

An image processing method according to an aspect of the present invention is an image processing method for processing picked-up image data obtained from an image pickup system, in which an interchangeable lens is detachably attached to a camera main body, including an image pickup section configured to pick up, on an image pickup plane on which a plurality of pixels are arrayed, an optical image formed by the interchangeable lens and output the picked-up image data having a predetermined sampling frequency, the image processing method including: a resolution changing step for generating, on the basis of the picked-up image data corresponding to a partial region in a screen, image data having resolution higher than resolution of the picked-up image data; and a control step for determining, on the basis of an MTF characteristic value corresponding to the partial region among a plurality of MTF characteristic values corresponding to a plurality of regions in the screen of the interchangeable lens and the predetermined sampling frequency, an upper limit of the resolution of the image data generated by the resolution changing step.

A recording medium according to an aspect of the present invention is a non-transitory computer-readable medium storing an image processing program for causing a computer to process picked-up image data obtained from an image pickup system, in which an interchangeable lens is detachably attached to a camera main body, including an image pickup section configured to pick up, on an image pickup plane on which a plurality of pixels are arrayed, an optical image formed by the interchangeable lens and output the picked-up image data having a predetermined sampling frequency, the image processing program including: a resolution changing step for generating, on the basis of the picked-up image data corresponding to a partial region in a screen, image data having resolution higher than resolution of the picked-up image data; and a control step for determining, on the basis of an MTF characteristic value corresponding to the partial region among a plurality of MTF characteristic values corresponding to a plurality of regions in the screen of the interchangeable lens and the predetermined sampling frequency, an upper limit of the resolution of the image data generated by the resolution changing step.

BRIEF DESCRIPTION OF THE DRAWINGS

FIG. 4 is a diagram showing a part of picked-up image data of a primary color Bayer array obtained from an image pickup device of the first embodiment;

FIG. 5 is a diagram showing pixel shift order of a Gr pixel in a one-pixel-shift super-resolution mode in the first embodiment;

FIG. 6 is a diagram showing pixel shift order of a Gb pixel in the one-pixel-shift super-resolution mode in the first embodiment;

FIG. 7 is a diagram showing pixel shift order of an R pixel in the one-pixel-shift super-resolution mode in the first embodiment;

FIG. 8 is a diagram showing pixel shift order of a B pixel in the one-pixel-shift super-resolution mode in the first embodiment;

FIG. 9 is a diagram showing pixel positions, which can be shifted by half pixel shift, added as blanks in a part of the picked-up image data of the primary color Bayer array obtained from the image pickup device in the first embodiment;

DETAILED DESCRIPTION OF THE PREFERRED EMBODIMENT

An embodiment of the present invention is explained below with reference to the drawings.

First Embodiment

Figure 1:
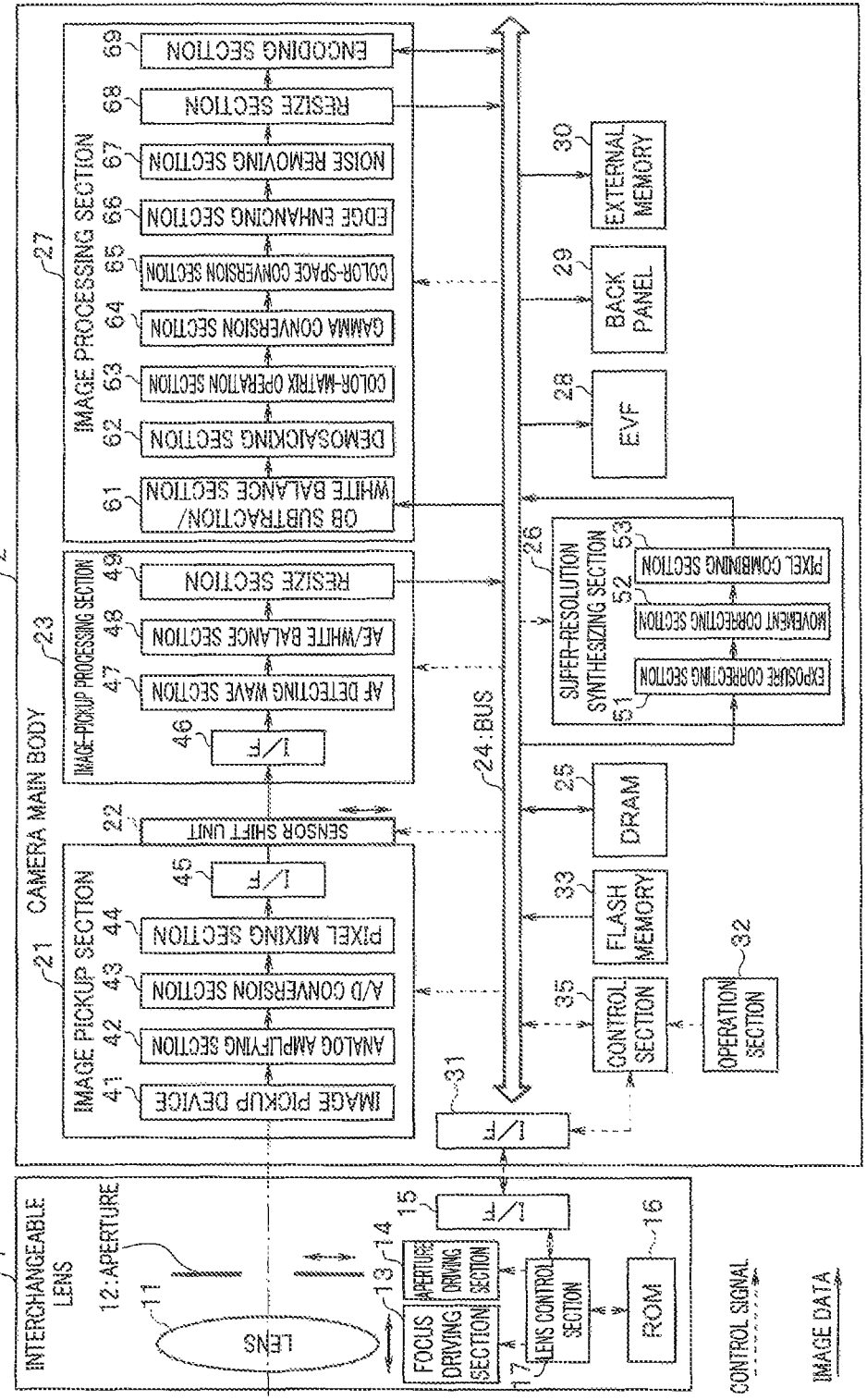
FIG. 1 is a block diagram showing the configuration of an image pickup system in a first embodiment of the present invention.

FIG. 1 to FIG. 33 show a first embodiment of the present invention. FIG. 1 is a block diagram showing the configuration of an image pickup system.

The image pickup system includes an interchangeable lens 1 and a camera main body 2 to which the interchangeable lens 1 is detachably attached. The image pickup system of the lens interchangeable type is hereinafter referred to as camera as appropriate. However, the image pickup system may be a communication apparatus having a telephone function or other apparatuses as long as the lens is interchangeable.

The interchangeable lens 1 includes a lens 11, an aperture 12, a focus driving section 13, an aperture driving section 14, an interface (I/F) 15, a ROM 16, and a lens control section 17.

The lens 11 forms an optical image of an object on an image pickup device 41 explained below. The lens 11 includes a focus lens for adjusting a focus position.

The aperture 12 changes an opening diameter to specify a passing range of a light beam that passes through the lens 11.

The focus driving section 13 drives the focus lens of the lens 11 to move in an optical axis direction.

The aperture driving section 14 drives the aperture 12 to change the opening diameter.

The interface (I/F) 15 is to cause the lens control section 17 of the interchangeable lens 1 to communicate with a control section 35 of the camera main body 2 explained below via an interface (I/F) 31 explained below on the camera main body 2 side.

The ROM 16 is a storing section configured to store a plurality of MTF (modulation transfer function) characteristic values corresponding to a plurality of regions in a screen.

The lens control section 17 controls the focus driving section 13 on the basis of a command from the control section 35 such that an optical image formed on the image pickup device 41 by the lens 11 is focused. The lens control section 17 controls the aperture driving section 14 on the basis of a command from the control section 35 such that the opening diameter of the aperture 12 is set to an opening diameter commanded by the command. Further, the lens control section 17 transmits the plurality of MTF characteristic values stored in the ROM 16 to the control section 35 of the camera main body 2 via the interface (I/F) 15 and the interface (I/F) 31.

The camera main body 2 includes an image pickup section 21, a sensor shift unit 22, an image-pickup processing section 23, a bus 24, a DRAM 25, a super-resolution synthesizing section 26, an image processing section 27, an electronic viewfinder (EVF) 28, a back panel 29, an external memory 30, the interface (I/F) 31, an operation section 32, a flash memory 33, and the control section 35.

The image pickup section 21 picks up, on an image pickup plane on which a plurality of pixels are arrayed, an optical image formed by the interchangeable lens 1 and outputs picked-up image data having a predetermined sampling frequency. The picked-up image data outputted by the image pickup section 21 may be data corresponding to the entire screen or may be data corresponding to a partial region in the screen. The image pickup section 21 includes the image pickup device 41, an analog amplifying section 42, an A/D conversion section 43, a pixel mixing section 44, and an interface (I/F) 45. The image pickup section 21 is configured as, for example, one image pickup unit.

The image pickup device 41 includes the image pickup plane explained above, converts light made incident on the respective pixels into an electric signal, and outputs the electric signal as an analog signal. The image pickup device 41 is configured as, for example, a single-plate image pickup device in which color filters of a primary color Bayer array are arranged on an image pickup plane (see FIG. 4 referred to below). However, the image pickup device 41 is not limited to the configuration. The image pickup device 41 may be, for example, an image pickup device in which pixels that respectively photoelectrically convert respective RGB color components are stacked in a substrate thickness direction or may be image pickup devices of other configurations. Note that the image pickup device 41 includes an effective pixel section in which effective pixels that receive the optical image of the object are arrayed and an OB pixel section in which OB pixels always in a light-blocked state with a light blocking film formed on the OB pixels.

The analog amplifying section 42 amplifies the analog signal outputted from the image pickup device 41.

The A/D conversion section 43 converts the analog signal amplified by the analog amplifying section 42 into a digital signal.

The pixel mixing section 44 mixes pixel values of pixels of the same color present in a spatial vicinity. The pixel mixing by the pixel mixing section 44 is performed by addition, averaging, weighted addition, and the like. Further, the number of mixed pixels can be changed according to a pixel mixing mode. The predetermined sampling frequency of the picked-up image data outputted from the image pickup section 21 is changed according to a change of the number of mixed pixels.

The pixel mixing by the pixel mixing section 44 is performed according to necessity when it is sufficient to output an image including the number of pixels smaller than all the pixels configured in the image pickup device 41, for example, when live-view display or moving image photographing is performed. By performing the pixel mixing with the pixel mixing section 44, a data amount of picked-up image data outputted from the image pickup section 21 decreases. It is possible to reduce a readout time period from the image pickup section 21 and achieve a high frame rate. Note that, for example, when pixel values of all the pixels configured in the image pickup device 41 are outputted as pixel values for a still image, the pixel mixing section 44 does not perform the pixel mixing.

The interface (I/F) 45 outputs, with an appropriate transmission scheme, for example, a serial transmission scheme, the digitized picked-up image data to an interface (I/F) 46 explained below of the image-pickup processing section 23.

With such a configuration, first, a basic sampling frequency of the sampling frequency of the picked-up image data outputted from the image pickup section 21 is determined according to a pixel pitch or the like in the pixel array of the image pickup device 41. Further, when the pixel mixing is performed by the pixel mixing section 44, the sampling frequency is changed according to the pixel mixing mode.

The sensor shift unit 22 is a pixel shifting section configured to perform pixel shift for moving the image pickup section 21 configured as the image pickup unit in a direction perpendicular to an optical axis of the lens 11 and shifting relative positions of an optical image and the image pickup section 21. The sensor shift unit 22 can be set to a plurality of pixel-shift super-resolution modes (respective super-resolution modes such as one pixel shift, half pixel shift, and one third pixel shift explained below) in which shift amounts (pixel shift amounts), the numbers of times of shift, and the like are different.

Note that a configuration for shifting the image pickup section 21 (a so-called sensor shift scheme) is explained as an example of the pixel shifting section. However, for example, a configuration for shifting the lens 11 and the aperture 12 (a so-called lens shift scheme) may be adopted. The sensor shift scheme and the lens shift scheme may be combined. Other configurations may be adopted.

The image-pickup processing section 23 performs basic processing after image pickup on the picked-up image data outputted from the image pickup section 21. The image-pickup processing section 23 includes an interface (I/F) 46, an AF (autofocus) detecting wave section 47, an AE (automatic exposure)/white balance section 48, and a resizing section 49.

The interface (I/F) 46 receives the picked-up image data transmitted from the interface (I/F) 45.

The AF detecting wave section 47 extracts, for example, a contrast component from an AF detection region in the picked-up image data received via the interface (I/F) 46, integrates the contrast component, and outputs the contrast component to the control section 35 as a contrast evaluation value. The control section 35 performs contrast AF processing for driving the focus lens in the lens 11 and focusing the focus lens such that the contrast evaluation value takes a maximum value. Note that, although the contrast AF is explained as an example, for example, a phase difference pixel may be provided among the pixels arrayed on the image pickup plane of the image pickup device 41. Phase difference AF may be performed on the basis of a signal outputted from the phase difference pixel. The phase difference AF and the contrast AF may be performed in combination. Other AF schemes may be adopted.

The AE/white balance section 48 extracts a luminance equivalent component (e.g., a luminance component itself or a G component) from the picked-up image data, performs weighted addition of the luminance equivalent component according to the AE scheme (center-weighted photometry, spot photometry, etc.), and outputs the luminance equivalent component to the control section 35 as an AE evaluation value. On the basis of the AE evaluation value, the control section 35 changes the opening diameter of the aperture 12 or controls an exposure time period of the image pickup device 41 and controls an amplification rate of the analog amplifying section 42.

Further, the AE/white balance section 48 performs white balance processing for multiplying color components (e.g., an R component and a B component) in the picked-up image data with a gain necessary for a white object to be displayed in white. More specifically, the AE/white balance section 48 performs processing for, for example, multiplying the color components with a gain corresponding to which of daytime sun, evening sun, an electric bulb, a fluorescent lamp, and the like is manually or automatically selected as a light source.

The resizing section 49 performs processing for, for example, when the live-view display or the moving image photographing is performed, reducing the number of pixels of picked-up image data to be outputted to the number of pixels of the back panel 29, the number of pixels of the EVF 28, or the number of pixels of a moving image for recording. Therefore, when resizing is unnecessary, for example, when a photographing mode is set in a still image photographing mode, the resizing section 49 does not perform the processing for reducing the number of pixels (resizing for confirming a still image after photographing with the back panel 29 or the EVF 28 is performed by a resizing section 68 explained below in the image processing section 27).

The picked-up image data processed by the image-pickup processing section 23 is transmitted to, for example, the DRAM 25 via the bus 24 and stored in the DRAM 25.

The bus 24 is a transmission line for performing transmission and reception of data among the respective sections in the camera main body 2.

The DRAM 25 is a volatile memory that can be accessed at high speed. The DRAM 25 is used to store the picked-up image data transmitted from the image-pickup processing section 23 and used to, for example, store image data and the like being processed by the super-resolution synthesizing section 26 and the image processing section 27.

The super-resolution synthesizing section 26 is a resolution changing section configured to generate, on the basis of the picked-up image data obtained from the image pickup section 21, image data having resolution higher than resolution of the picked-up image data. More specifically, the super-resolution synthesizing section 26 synthesizes super-resolution image data having resolution higher than resolution of one picked-up image data from a plurality of picked-up image data acquired in the pixel-shift super-resolution mode. The super-resolution synthesizing section 26 includes an exposure correcting section 51, a movement correcting section 52, and a pixel combining section 53.

The exposure correcting section 51 corrects an exposure amount of the picked-up image data such that exposure amounts of the same object in the plurality of picked-up image data are the same.

The movement correcting section 52 performs movement correction such that positions of the same object in the plurality of picked-up image data are the same.

The pixel combining section 53 combines the plurality of picked-up image data to generate super-resolution image data having resolution higher than the resolution of one picked-up image data. The image combination processing is explained more in detail with reference to FIG. 4 to FIG. 18 below.

The image processing section 27 performs various kinds of image processing such as development processing on the picked-up image data obtained from the image pickup section 21 or the super-resolution image data generated by the super-resolution synthesizing section 26 and generates image data for recording or image data for display. The image processing section includes an OB subtraction/white balance section 61, a demosaicking section 62, a color-matrix operation section 63, a gamma conversion section 64, a color-space conversion section 65, an edge enhancing section 66, a noise removing section 67, a resizing section 68, and an encoding section 69.

The OB subtraction/white balance section 61 subtracts OB pixel data from effective pixel data of the image pickup device 41 and performs white balance adjustment.

The demosaicking section 62 performs demosaicking processing for performing pixel interpolation of picked-up image data of a primary color Bayer array configured from only one color component per one pixel as shown in FIG. 4 to thereby convert the picked-up image data into image data configured by three color components per one pixel.

The color-matrix operation section 63 performs processing for configuring, for example, as a matrix of three rows and one column (or one row and three columns), RGB components of respective pixel data configuring the image data and performing a matrix operation of a color matrix of three rows and three columns on the pixel data.

The gamma conversion section 64 performs gamma conversion processing, which is nonlinear processing, on the image data. A gradation characteristic of the image data is changed to a characteristic suitable for observing an image on the back panel 29 or the EVF 28 by the gamma conversion processing.

The color-space conversion section 65 converts the image data configured by the RGB components into, for example, image data configured by luminance color difference components.

The edge enhancing section 66 extracts an edge component from a luminance component of the image data, enhances the extracted edge component, and thereafter adds the edge component to the image data to perform edge enhancement processing.

The noise removing section 67 performs noise removal processing for removing a noise component from the image data.

The resizing section 68 is a resolution changing section configured to generate, on the basis of the picked-up image data acquired from the image pickup section 21, image data having resolution higher than the resolution of the picked-up image data. More specifically, the resizing section 68 is an image enlarging section configured to interpolate pixels of the picked-up image data corresponding to a partial region in the screen and generate enlarged image data. The resizing section 68 performs so-called digital zoom. Further, the resizing section 68 also performs processing for converting the resolution of the image data into, for example, display resolution of the EVF 28 or display resolution of the back panel 29.

The encoding section 69 performs processing for encoding the image data according to, for example, a JPEG encoding scheme. The encoding section 69 also performs processing for decoding the encoded image data according to, for example, a JPEG decoding scheme.

The electronic viewfinder (EVF) 28 is a display section configured to display the image data for display generated by the image processing section 27 and various kinds of information related to the camera and observe the image data and the information via an eyepiece or the like.

The back panel 29 is a display section disposed on the back side of the camera main body 2 (the opposite side of the surface on which the interchangeable lens 1 is disposed) and configured to display the image data for display generated by the image processing section 27 and the various kinds of information concerning the camera.

The external memory 30 is a recording medium configured by a memory card or the like detachably attachable to the camera main body 2 and configured to record, in a nonvolatile manner, the image data for recording generated by the image processing section 27.

The interface (I/F) 31 performs communication with the interface (I/F) 15 of the interchangeable lens 1. The interface (I/F) 31 is a receiving section configured to receive the plurality of MTF characteristic values explained above from the ROM 16 of the interchangeable lens 1.

The operation section 32 is a section for a user to perform various operation inputs related to the camera. The operation section 32 includes operation members such as a power button for turning on and off a power supply, a release button for operating photographing start and end, and an operation button for selecting and determining various menus displayed on the back panel 29 or the like. Items that can be set by the operation section 32 include a photographing mode (a still image photographing mode and a moving image photographing mode) and a reproduction mode. Detailed setting items in the photographing mode include a one-image photographing mode, a digital zoom mode, a pixel-shift supper-resolution mode, and the like.

The flash memory 33 is a storage medium that stores, in a nonvolatile manner, a processing program executed by the control section 35 in order to control the camera, processing parameters necessary when the control section 35 controls the camera (various parameters necessary for the execution of the processing program, parameters adjusted during factor shipment, and the like), setting values set by the user, and the like.

The control section 35 controls the respective sections in the camera main body 2 and performs control of the interchangeable lens 1 via the interface 31 according to the processing program stored in the flash memory 33.

The control section 35 determines, on the basis of the plurality of MTF characteristic values received by the interface (I/F) 31 and the predetermined sampling frequency, an upper limit of the resolution of the image data generated by the resolution changing section.

Figure 24:
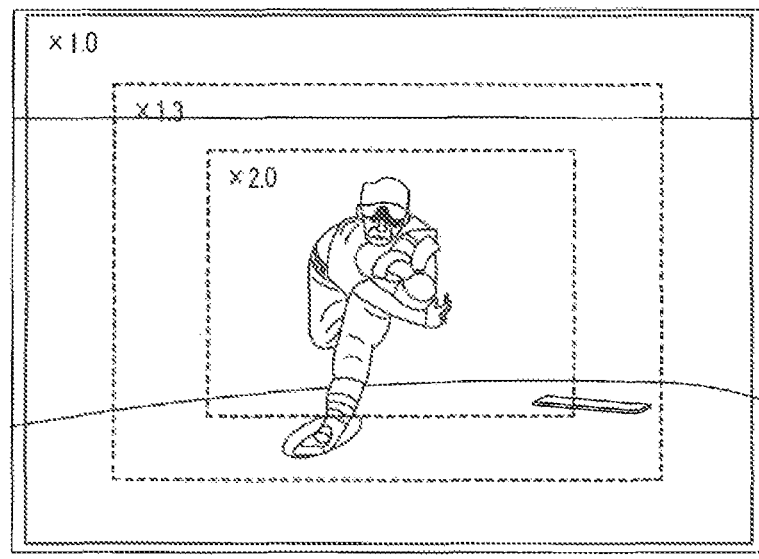
FIG. 24 is a diagram showing a first display example of digital zoom magnifications selectable when a digital zoom mode is set and live-view display is performed at a magnification of 1.0.
Figure 25:
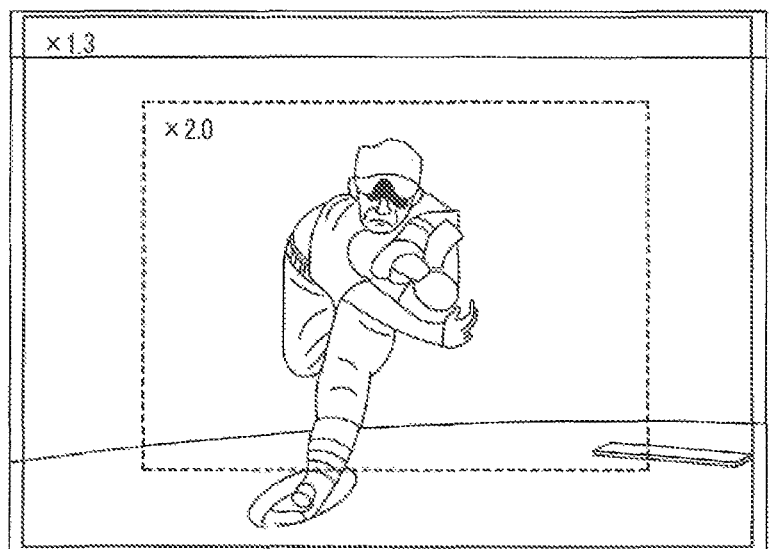
FIG. 25 is a diagram showing a first display example of digital zoom magnifications selectable when the digital zoom mode is set and the live-view display is performed at a magnification of 1.3.

That is, when the digital zoom mode is set, the control section 35 determines an upper limit enlargement magnification of the enlarged image data on the basis of an MTF characteristic value corresponding to a partial region, which is a target of the digital zoom, among the plurality of MTF characteristic values and the predetermined sampling frequency. A digital zoom magnification equal to or lower than the upper limit enlargement magnification is displayed on the screen as shown in FIG. 24 and FIG. 25 below. The user can select a desired digital zoom magnification in a range of a digital zoom magnification equal to or lower than the upper limit enlargement magnification.

The control section 35 determines, on the basis of the plurality of MTF characteristic values received via the interface (I/F) 31 and the predetermined sampling frequency, pixel-shift super-resolution modes corresponding to the upper limit of the resolution out of the plurality of pixel-shift super-resolution modes (consequently, pixel-shift super-resolution modes corresponding to resolution equal to or lower than the upper limit of the resolution is also determined). On the basis of a pixel-shift super-resolution mode selected by the user among a determined plurality of pixel-shift super-resolution modes, the control section 35 causes the image pickup section 21 to perform image pickup a plurality of times while causing the sensor shift unit 22 to perform the pixel shift and causes the image pickup section 21 to acquire a plurality of picked-up image data in different relative positions. The control section 35 causes the super-resolution synthesizing section 26 to synthesize super-resolution image data on the basis of the acquired plurality of picked-up image data.

Further, the control section 35 determines, on the basis of the plurality of MTF characteristic values, an upper limit value of the predetermined sampling frequency of the picked-up image data outputted from the image pickup section 21. More specifically, when resolution of the attached interchangeable lens 1 is lower than resolution of the image pickup device 41, since improvement of the resolution cannot be expected even if readout of all the pixels configured on the image pickup plane of the image pickup device 41 is performed, it is possible to reduce a readout time period of the picked-up image data from the image pickup section 21 by causing the pixel mixing section 44 to perform appropriate pixel mixing on the basis of the determined upper limit value of the predetermined sampling frequency.

In the camera having the configuration shown in FIG. 1, when an image is acquired, an optical image of the object formed via the interchangeable lens 1 is received and photoelectrically converted by the image pickup device 41, processed in the image pickup section 21, and thereafter outputted as picked-up image data. The picked-up image data is processed by the image-pickup processing section 23 and thereafter stored in, for example, the DRAM 25.

In the case of normal one-image photographing, the picked-up image data stored in the DRAM 25 is processed by the image processing section 27, recorded in the external memory 30, and displayed on the EVF 28 or the back panel 29.

At this time, when the photographing mode is set in the digital zoom mode, the resizing section 68 segments a region corresponding to a set digital zoom magnification or the like and performs enlargement processing. Note that, instead of segmenting the region corresponding to the digital zoom magnification or the like from picked-up image data of the entire screen, picked-up image data of only the region corresponding to the digital zoom magnification or the like may be outputted from the image pickup section 21.

When the photographing mode is set in the pixel-shift super-resolution mode, the control section 35 acquires a plurality of picked-up image data with the image pickup section 21 while driving the sensor shift unit 22 according to in which pixel-shift super-resolution mode the photographing mode is set among the one-pixel shift, the half pixel shift, the one third pixel shift, and the like, processes the plurality of picked-up image data with the image-pickup processing section 23, and stores the plurality of picked-up image data in, for example, the DRAM 25. The super-resolution synthesizing section 26 synthesizes super-resolution image data on the basis of the acquired plurality of picked-up image data and causes the DRAM 25 to store the super-resolution image data again. Thereafter, the super-resolution image data is processed by the image processing section 27. As explained above, recording and display are performed.

Figures 2, 3:
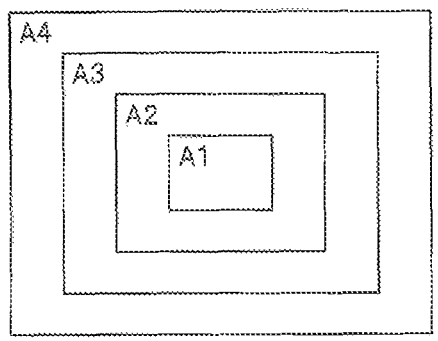
FIG. 2 is a diagram showing an example of a plurality of regions for dividing a screen in the first embodiment.
FIG. 3 is a table showing an example of MTF characteristic values for each of regions stored in a ROM of an interchangeable lens of the first embodiment.

The plurality of MTF characteristic values corresponding to the plurality of regions in the screen stored in the ROM 16, which is a storing section, are explained with reference to FIG. 2 and FIG. 3. FIG. 2 is a diagram showing an example of a plurality of regions for dividing the screen. FIG. 3 is a table showing an example of MTF characteristic values for each of the regions stored in the ROM 16 of the interchangeable lens 1.

In general, an optical characteristic of the interchangeable lens 1 is high near a center of the screen and is lower toward a periphery of the screen. Therefore, for example, boundaries of regions are formed in rectangular shapes as shown in an example shown in FIG. 2. The screen is divided into four concentric regions, that is, a region A1 in a center portion to a region A4 in a peripheral edge portion. The regions A1 to A4 do not have overlapping portions one another. When all the regions A1 to A4 are combined, the entire screen is configured. The region A1 is a rectangular region, the region A2 is a region having a rectangular ring-like region on an outer peripheral side of the region A1, the region A3 is a rectangular ring-like region on the outer peripheral side of the region A2, and the region A4 is a rectangular ring-like region on the outer peripheral side of the region A3.

Note that, naturally, a method of dividing the screen into a plurality of regions is not limited to the example shown in FIG. 2. For example, the screen may be divided in a mesh shape in a horizontal direction and a vertical direction or may be divided such that boundaries of regions form concentric circles according to an optical characteristic. Other dividing methods may be used.

In the ROM 16, for example, MTF characteristic values of the respective regions A1 to A4 shown in FIG. 3 are stored. In an example shown in FIG. 3, the MTF characteristic values indicate that resolution is high in the region A1 and is lower in the region A2, the region A3, and the region A4 toward the peripheral portion.

FIG. 4 is a diagram showing a part of the picked-up image data of the primary color Bayer array obtained from the image pickup device 41.

The primary color Bayer array is an array in which, with 2×2 pixels are set as a basic array, G pixels are arranged in diagonal positions of the basic array and R pixels and B pixels are arranged in the remaining diagonal positions. For convenience, the G pixels present on the same line as the R pixels are represented as Gr pixels and the G pixels present on the same line as the B pixels are represented as Gb pixels. However, the Gr pixels and the Gb pixels have no difference as color components. Both of the Gr pixels and the Gb pixels are G components.

In the case of the normal one-image pickup, since the picked-up image data of the primary color Bayer array shown in FIG. 4 is acquired, the demosaicking section 62 performs processing for interpolating, for example, an R component missing in the G pixel from a pixel value of the R pixel near the G pixel and creating the R component and further interpolating a B component missing in the G pixel from a pixel value of the B pixel near the G pixel and creating the B component. Similarly, the demosaicking section 62 interpolates a G component and a B component from the G pixel and the B pixel near the R pixel and creates the G component and the B components and interpolates a G component and an R component from the G pixel and the R pixel near the B pixel and creates the G component and the B component.

Figures 8, 9:
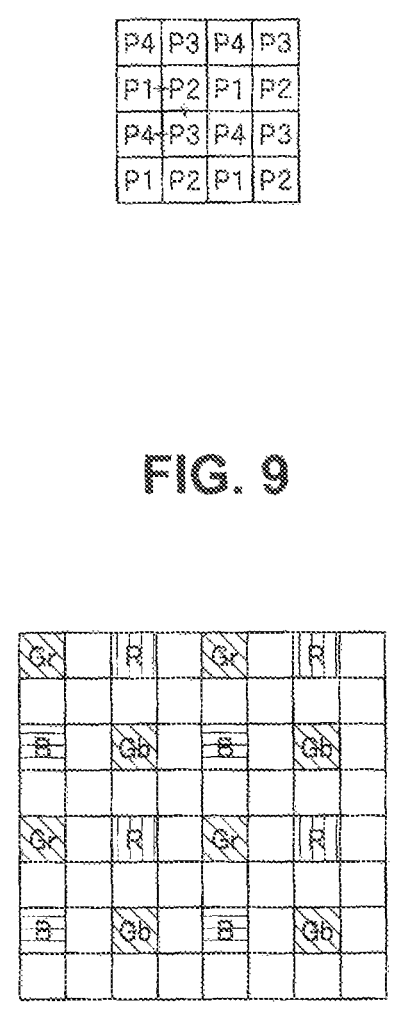

FIG. 5 to FIG. 8 are diagrams for explaining an example of pixel-shift order in the one-pixel-shift super-resolution mode. FIG. 5 is a diagram showing pixel-shift order of a Gr pixel in the one-pixel-shift super-resolution mode. FIG. 6 is a diagram showing pixel-shift order of a Gb pixel in the one-pixel-shift super-resolution mode. FIG. 7 is a diagram showing pixel-shift order of an R pixel in the one-pixel-shift super-resolution mode. FIG. 8 is a diagram showing pixel-shift order of a B pixel in the one-pixel-shift super-resolution mode.

In the example shown in FIG. 5 to FIG. 8, after first picked-up image data P1 is acquired, a pixel is shifted to the right by one pixel to acquire second picked-up image data P2, shifted downward by one pixel to acquire third picked-up image data P3, and shifted to the left by one pixel to acquire fourth picked-up image data P4.

Consequently, since the respective components can be acquired concerning all pixel positions in all of the Gr pixels, the Gb pixels, the R pixels, and the B pixels, the demosaicking processing is unnecessary. Further, since both of the Gr pixels and the Gb pixels are acquired concerning the G pixels, by setting, for example, averages of the Gr pixels and the Gb pixels as the G pixels, it is possible to obtain G pixel components having lower noise. In this way, image data having resolution higher than the resolution of the picked-up image data is generated by the super-resolution synthesizing section 26, which is the resolution changing section, on the basis of the picked-up image data obtained from the image pickup section 21.

Figure 10:
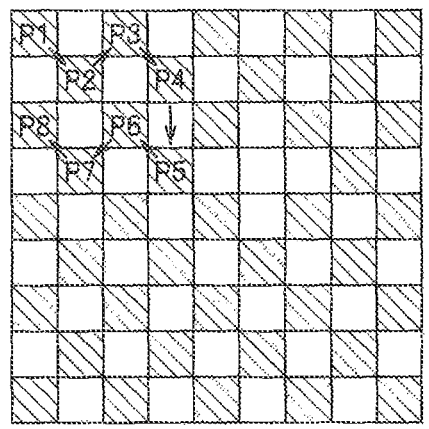
FIG. 10 is a diagram showing pixel shift order of a Gr pixel in a half-pixel-shift super-resolution mode in the first embodiment.
Figure 11:
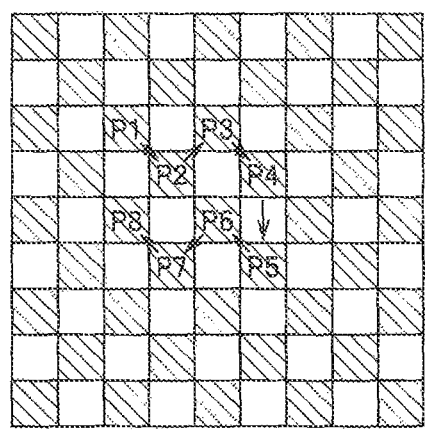
FIG. 11 is a diagram showing pixel shift order of a Gb pixel in the half-pixel-shift super-resolution mode in the first embodiment.
Figure 12:
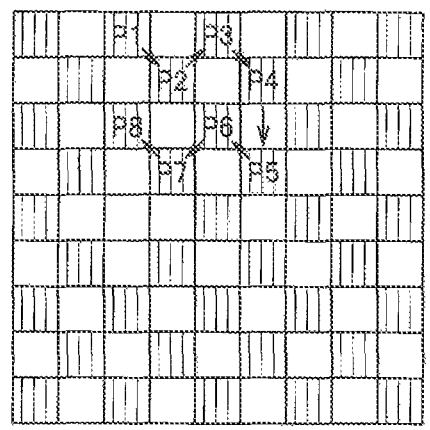
FIG. 12 is a diagram showing pixel shift order of an R pixel in the half-pixel-shift super-resolution mode in the first embodiment.
Figure 13:
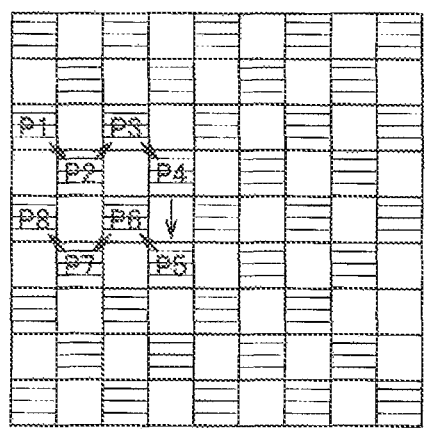
FIG. 13 is a diagram showing pixel shift order of a B pixel in the half-pixel-shift super-resolution mode in the first embodiment.

FIG. 9 to FIG. 13 are diagrams for explaining an example of pixel-shift order in the half-pixel-shift super-resolution mode. FIG. 9 is a diagram showing pixel positions, which can be shifted by the half pixel shift, added as blanks in a part of the picked-up image data of the primary color Bayer array obtained from the image pickup device 41. FIG. 10 is a diagram showing pixel shift order of a Gr pixel in the half-pixel-shift super-resolution mode. FIG. 11 is a diagram showing pixel shift order of a Gb pixel in the half-pixel-shift super-resolution mode. FIG. 12 is a diagram showing pixel shift order of an R pixel in the half-pixel-shift super-resolution mode. FIG. 13 is a diagram showing pixel shift order of a B pixel in the half-pixel-shift super-resolution mode.

An interval of squares shown in FIG. 9 to FIG. 13 is a half pixel pitch.

When a pixel shift amount is represented by (x, y) with the pixel pitch set as a unit, a right direction set as an x positive direction, and an upward direction set as a y positive direction, in the example shown in FIG. 10 to FIG. 13, after first picked-up image data P1 is acquired, a pixel is shifted by (½, −½) to acquire second picked-up image data P2, shifted by (½, ½) to acquire third picked-up image data P3, shifted by (½, −½) to acquire fourth picked-up image data P4, shifted by (0, −1) to acquire fifth picked-up image data P5, shifted by (−½, ½) to acquire sixth picked-up image data P6, and shifted by (−½, −½) to acquire seventh picked-up image data P7, and shifted by (−½, ½) to acquire eighth picked-up image data P8.

Consequently, mosaic-like components as many as a half of a total number of pixels shown in FIG. 10 to FIG. 13 can be acquired in all of the Gr pixels, the Gb pixels, the R pixels, and the B pixels. Among the components, for example, averages of the Gr components and the Gb components are calculated and set as G components. When the mosaic-like RGB components are obtained in this way, the demosaicking processing only has to be performed by the demosaicking section 62 later.

In this way, the half pixel shift is performed to acquire eight images and generate super-resolution image data and the image processing is further performed to generate image data. Consequently, it is possible to acquire image data having pixel density longitudinally twice and laterally twice as high as pixel density of image data obtained by directly subjecting picked-up image data obtained from the image pickup device 41 to the image processing. In this way, image data having resolution higher than the resolution of the picked-up image data is generated by the super-resolution synthesizing section 26, which is the resolution changing section, on the basis of the picked-up image data obtained from the image pickup section 21.

Figure 14:
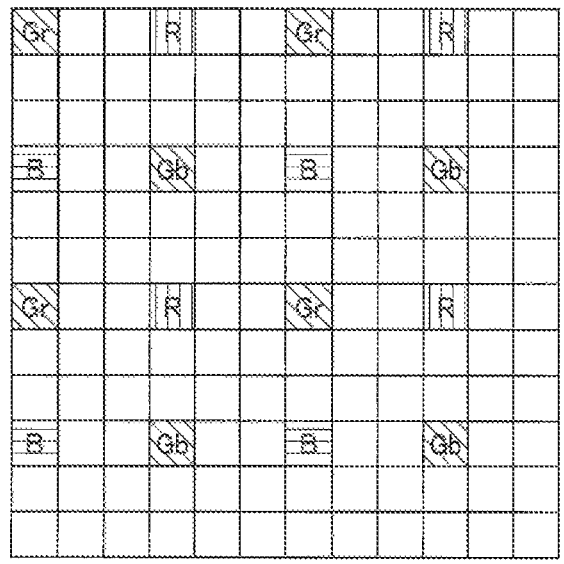
FIG. 14 is a diagram showing pixel positions, which can be shifted by one third pixel shift, added as blanks in a part of the picked-up image data of the primary color Bayer array obtained from the image pickup device in the first embodiment.
Figure 15:
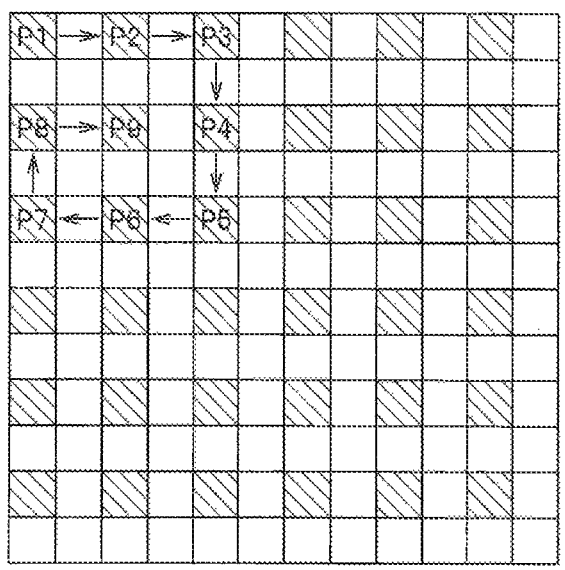
FIG. 15 is diagram showing pixel shift order of a Gr pixel in a one-third-pixel-shift super-resolution mode in the first embodiment.
Figure 16:
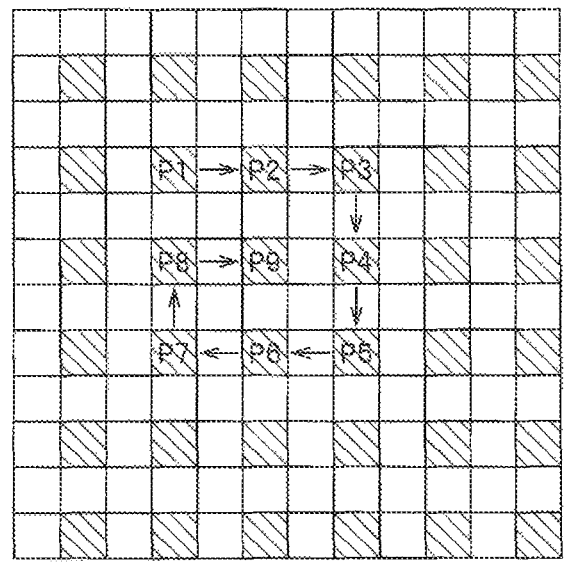
FIG. 16 is a diagram showing pixel shift order of a Gb pixel in the one-third-pixel-shift super-resolution mode in the first embodiment.
Figure 17:
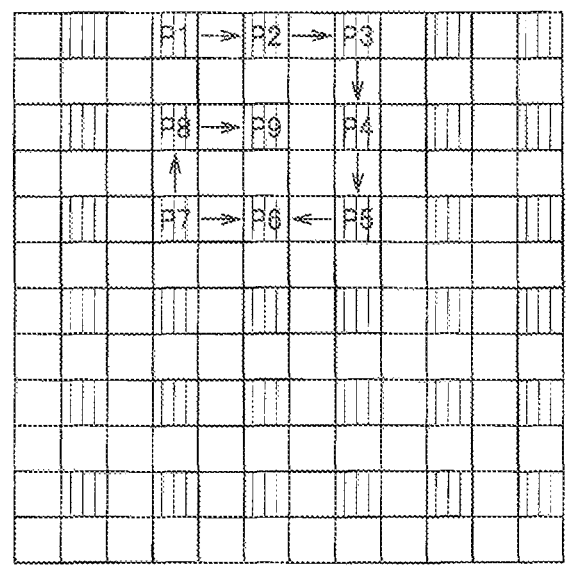
FIG. 17 is a diagram showing pixel shift order of an R pixel in the one-third-pixel-shift super-resolution mode in the first embodiment.
Figures 18, 19:
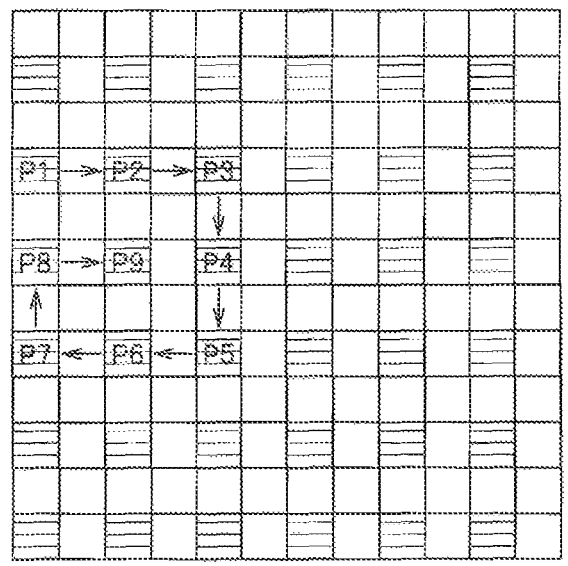
FIG. 18 is a diagram showing pixel shift order of a B pixel in the one-third-pixel-shift super-resolution mode in the first embodiment.
FIG. 19 is a table showing angles of view and digital zoom magnifications corresponding to combinations of the plurality of regions for dividing the screen in the first embodiment.

FIG. 14 to FIG. 18 are diagrams for explaining an example of pixel-shift order in the one-third-pixel-shift super-resolution mode. FIG. 14 is a diagram showing pixel positions, which can be shifted by the one third pixel shift, added as blanks in a part of the picked-up image data of the primary color Bayer array obtained from the image pickup device 41. FIG. 15 is diagram showing pixel shift order of a Gr pixel in the one-third-pixel-shift super-resolution mode. FIG. 16 is a diagram showing pixel shift order of a Gb pixel in the one-third-pixel-shift super-resolution mode. FIG. 17 is a diagram showing pixel shift order of an R pixel in the one-third-pixel-shift super-resolution mode. FIG. 18 is a diagram showing pixel shift order of a B pixel in the one-third-pixel-shift super-resolution mode.

An interval of squares shown in FIG. 14 to FIG. 18 is a one third pixel pitch.

When a pixel shift amount is represented by (x, y) as explained above, in the example shown in FIG. 15 to FIG. 18, after first picked-up image data P1 is acquired, a pixel is shifted by (⅔, 0) to acquire second picked-up image data P2, shifted by (⅔, 0) to acquire third picked-up image data P3, shifted by (0, −⅔) to acquire fourth picked-up image data P4, shifted by (0, −⅔) to acquire fifth picked-up image data P5, shifted by (−⅔, 0) to acquire sixth picked-up image data P6, shifted by (−⅔, 0) to acquire seventh picked-up image data P7, and shifted by (0, ⅔) to acquire eighth picked-up image data P8, and shifted by (⅔, 0) to acquire ninth picked-up image data P9.

Consequently, components as many as a quarter of a total number of pixels shown in FIG. 15 to FIG. 18 can be acquired in all of the Gr pixels, the Gb pixels, the R pixels, and the B pixels. When the Gr pixels, the Gb pixels, the R pixels, and the B pixels shown in FIG. 15 to FIG. 18 are combined, super-resolution image data of the primary color Bayer array having a pixel pitch of ⅓ is obtained. Therefore, the demosaicking processing only has to be performed on the super-resolution image data of the primary color Bayer array by the demosaicking section 62 later.

In this way, the one third pixel shift is performed to acquire nine images and generate super-resolution image data and the image processing is further performed to generate image data. Consequently, it is possible to acquire image data having pixel density longitudinally three times and laterally three times as high as pixel density of image data obtained by directly subjecting picked-up image data obtained from the image pickup device 41 to the image processing. In this way, image data having resolution higher than the resolution of the picked-up image data is generated by the super-resolution synthesizing section 26, which is the resolution changing section, on the basis of the picked-up image data obtained from the image pickup section 21.

Figure 31:
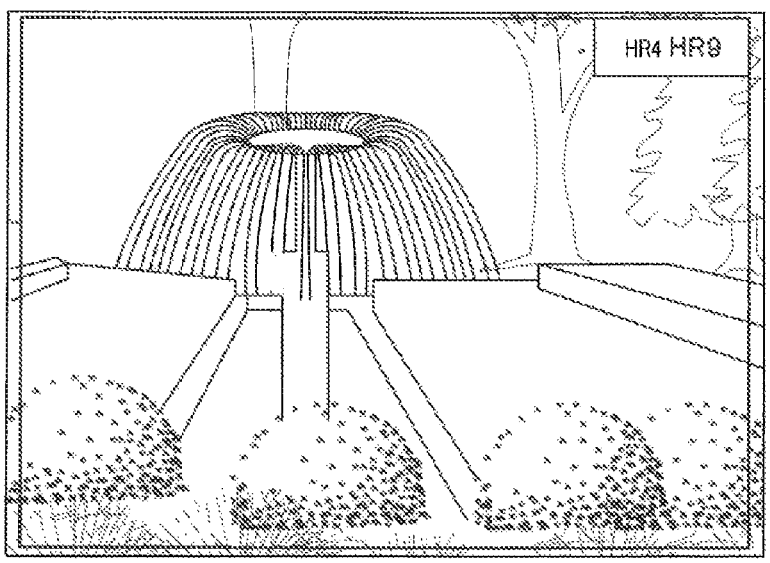
FIG. 31 is a diagram showing a display example of trimming frames and shift amounts at the time when the live-view display is performed at the angle of view of 25%, the pixel-shift super-resolution mode is set, and the one-third-pixel-shift super-resolution mode is selected at the angle of view of 25%.
Figure 32:
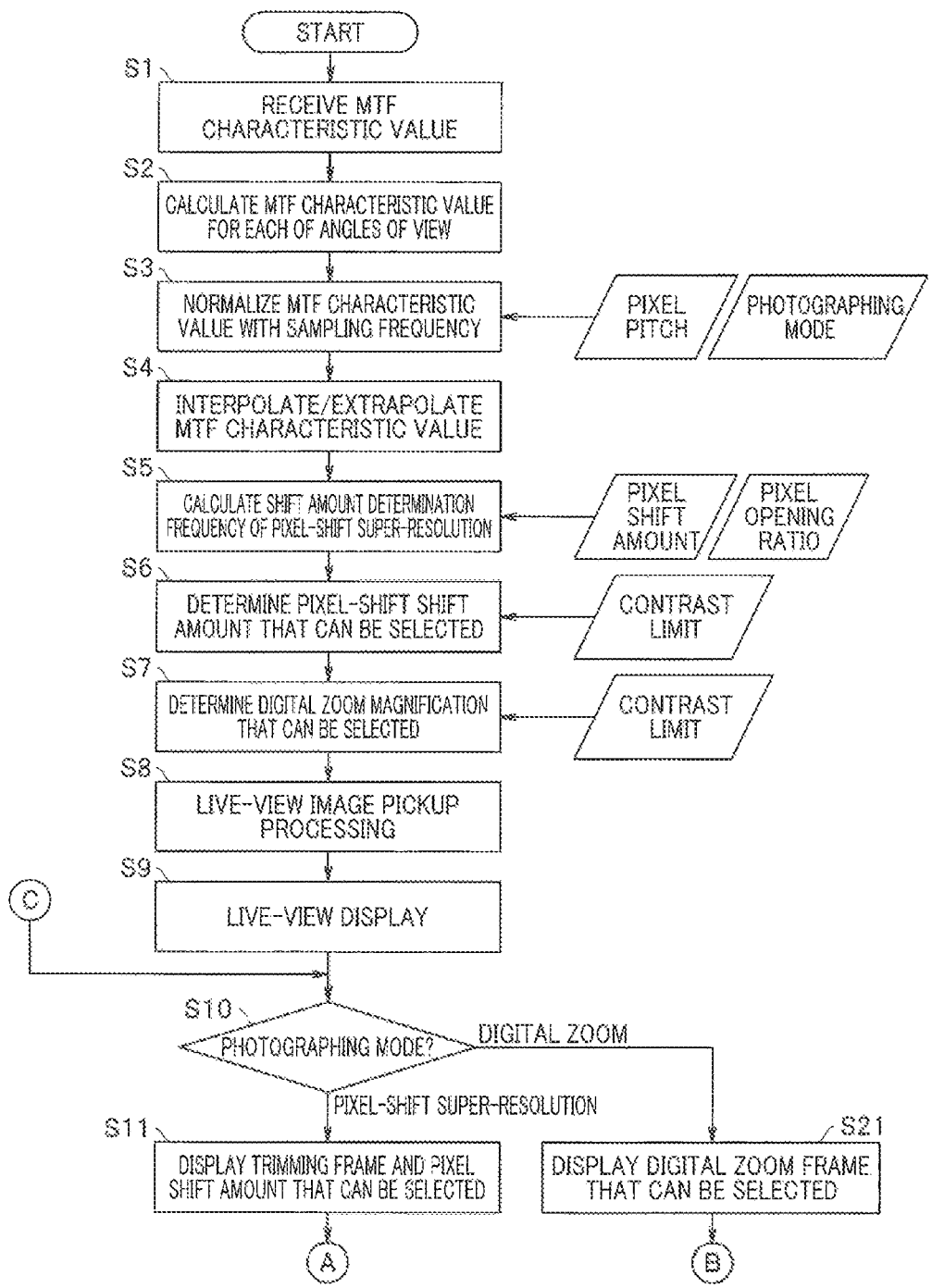
FIG. 32 is a flowchart showing a part of action of the image pickup system in the pixel-shift super-resolution mode or the digital zoom mode in the first embodiment.
Figure 33:
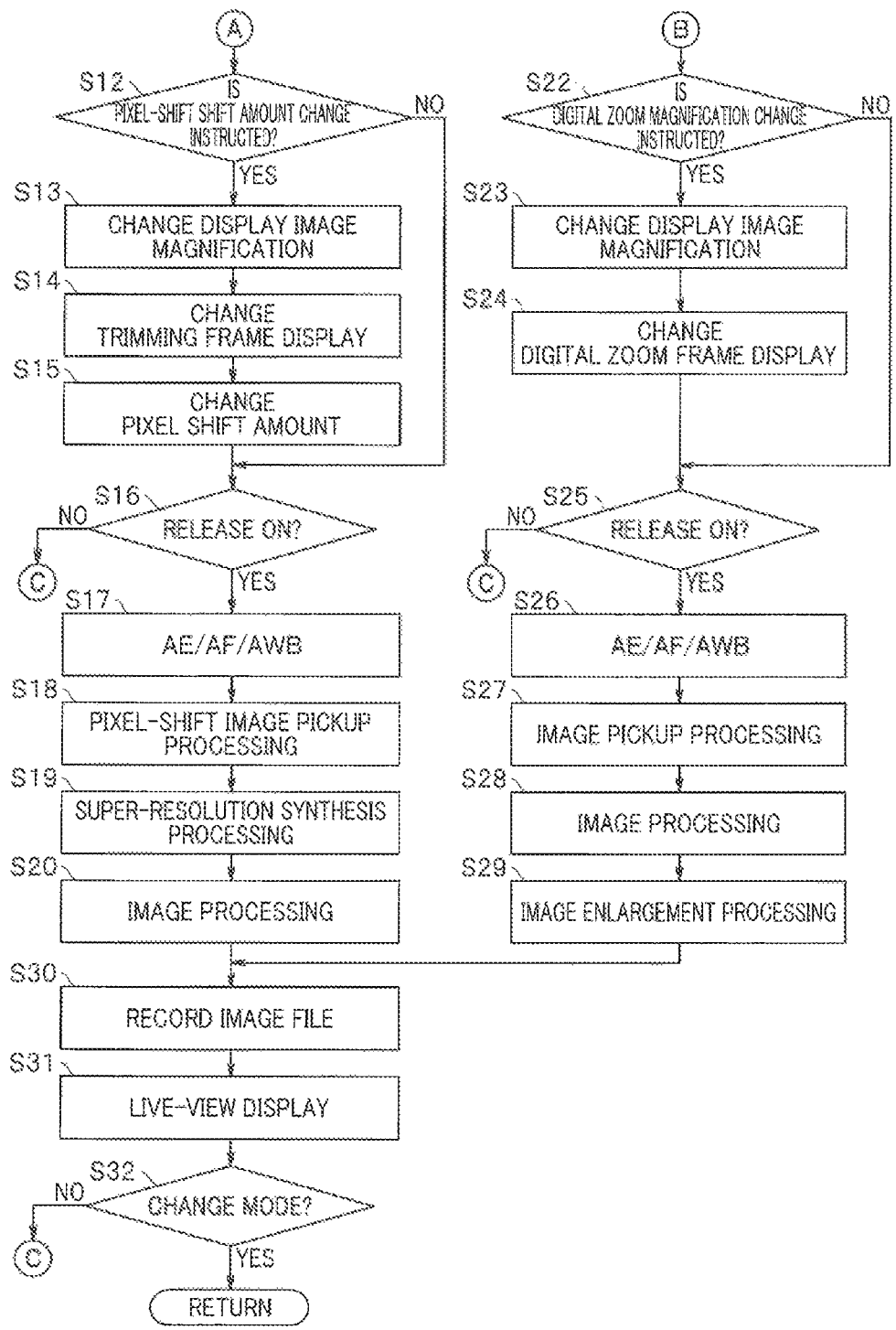
FIG. 33 is a flowchart showing another part of the action of the image pickup system in the pixel-shift super-resolution mode or the digital zoom mode in the first embodiment.

Action of the image pickup system at the time when the photographing mode is set to the pixel-shift super-resolution mode or the digital zoom mode is explained according to FIG. 32 and FIG. 33 with reference to FIG. 19 to FIG. 31. Note that the photographing mode can be set to other various modes including the normal one-image photographing mode. However, for simplification, a case is explained in which the photographing mode is set to either one of the pixel-shift super-resolution mode and the digital zoom mode.

FIG. 32 is a flowchart showing a part of action of the image pickup system in the pixel-shift super-resolution mode or the digital zoom mode. FIG. 33 is a flowchart showing another part of the action of the image pickup system in the pixel-shift super-resolution mode or the digital zoom mode. In FIG. 32 and FIG. 33, for convenience of drawing description, one flowchart is divided into two and shown. Processing shown in FIG. 32 and FIG. 33 is performed by the control section 35 controlling the respective sections in the image pickup system according to the processing program stored in the flash memory 33.

When the photographing mode is set to the pixel-shift super-resolution mode or the digital zoom mode during execution of not-shown main processing, the processing is started.

Then, first, the control section 35 receives the MTF characteristic values (see FIG. 3) stored in the ROM 16 of the interchangeable lens 1 from the lens control section 17 via the interfaces (I/Fs) 15 and 31 (step S1).

Figure 20:
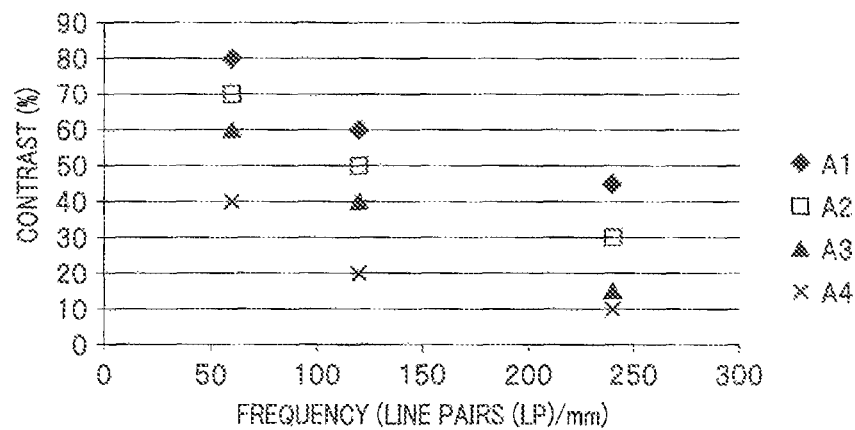
FIG. 20 is a graph showing, in a form of a graph, an example of MTF characteristic values stored in the ROM of the interchangeable lens in the first embodiment.

FIG. 20 is a graph showing, in a form of a graph, an example of the MTF characteristic values stored in the ROM 16 of the interchangeable lens 1.

Figure 21:
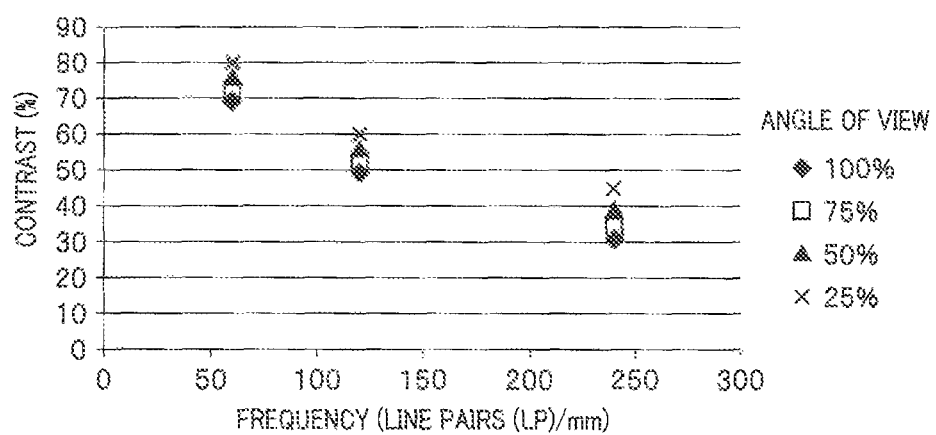
FIG. 21 is a graph showing an example of MTF characteristic values for each of angles of view in the first embodiment.

Subsequently, the control section 35 calculates MTF characteristic values for each of angles of view shown in FIG. 21 on the basis of the MTF characteristic values shown in FIG. 20 received from the interchangeable lens 1 (step S2). FIG. 21 is a graph showing an example of the MTF characteristic values for each of angles of view. FIG. 19 is a table showing angles of view and digital zoom magnifications corresponding to combinations of a plurality of regions for dividing the screen.

First, as shown in FIG. 19, when all of four regions for dividing the screen are added up (A1+A2+A3+A4), an angle of view is 100% and magnification is 1.0. When three regions excluding the region A4 in the peripheral edge portion are added up (A1+A2+A3), an angle of view is 75% and magnification is 1.3. Further, when the region A3 is also excluded (A1+A2), an angle of view is 50% and magnification is 2.0. In the case of only the region A1, an angle of view is 25% and magnification is 4.0.

Therefore, the control section 35 calculates MTF characteristic values of the angles of view 100%, 75%, 50%, and 25% shown in FIG. 21 respectively on the basis of the MTF characteristic values for each of the regions A1 to A4 shown in FIG. 20 (or FIG. 3). More specifically, the control section 35 calculates the MTF characteristic values for each of the angles of view shown in FIG. 21 by performing weighted addition of contrast values of the respective regions A1 to A4 according to the angles of view (e.g., at the angle of view of 100%, A1 to A4 and, at the angle of view of 75%, A1 to A3). Weight used in the weighted addition is set large near an image center and set relatively small in an image periphery according to importance during image observation.

Subsequently, the control section 35 acquires information concerning a pixel pitch of the image pickup device 41 from the flash memory 33 and calculates, on the basis of the information concerning the pixel pitch and information concerning a currently-set photographing mode (e.g., information concerning the pixel mixing by the pixel mixing section 44), a sampling frequency (or a Nyquist frequency) of the picked-up image data outputted from the image pickup section 21. The control section 35 normalizes the MTF characteristic values on the basis of the calculated sampling frequency (or the Nyquist frequency; the same applies below) (step S3).

Figure 22:
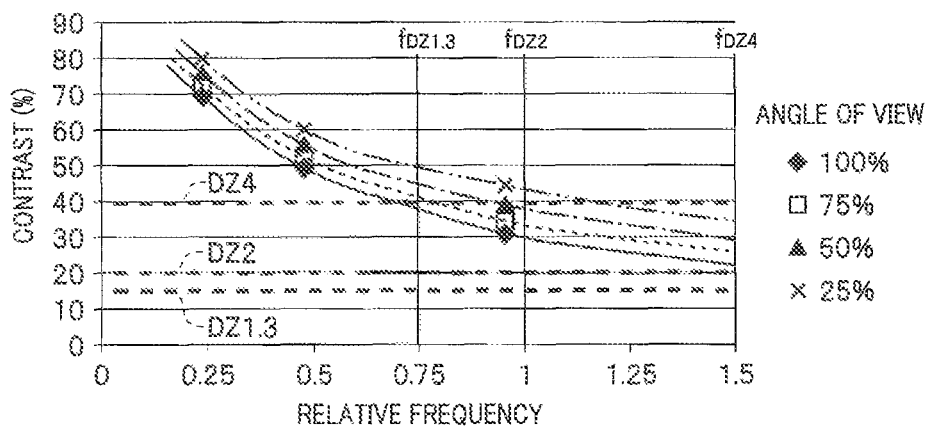
FIG. 22 is a graph showing the MTF characteristic values normalized by a sampling frequency and contrast limits in digital zoom.

FIG. 22 is a graph showing the MTF characteristic values normalized by the sampling frequency and contrast limits in the digital zoom. A horizontal axis in FIG. 22 indicates a relative frequency normalized by the sampling frequency.

In FIG. 22, a dotted line DZ1.3 near contrast of 15% indicates a contrast limit at a digital zoom magnification of 1.3. Similarly, a dotted line DZ2 near contrast of 20% indicates a contrast limit at a digital zoom magnification of 2. A dotted line DZ4 near contrast of 40% indicates a contrast limit at a digital zoom magnification of 4. The contrast limits of the digital zoom are set in advance for the camera main body 2 and stored in the flash memory 33, for example, during manufacturing. Note that an example of the magnifications 1.3, 2, and 4 is shown. However, contrast limits of the digital zoom corresponding to all magnifications that can be set in the camera main body 2 may be stored in the flash memory 33 in advance. A contrast limit of the digital zoom with respect to an intermediate magnification may be calculated by interpolation.

Further, in FIG. 22, fDZ1.3 indicates a determination frequency of a lens MTF at the digital zoom magnification of 1.3, fDZ2 indicates a determination frequency of the lens MTF at the digital zoom magnification of 2, and fDZ4 indicates a determination frequency of the lens MTF at the digital zoom magnification of 4. For example, a selectable digital zoom magnification is determined by comparing the lens MTF at the determination frequency fDZ1.3 and the contrast limit DZ1.3.

The control section 35 interpolates or extrapolates, for each of angles of view, the MTF characteristic values normalized as shown in FIG. 22 to make it possible to calculate, for each of the angles of view, contrast at any relative frequency (step S4). In FIG. 22, a solid line indicates an interpolation/extrapolation curve at the angle of view of 100%, a dotted line indicates an interpolation/extrapolation curve at the angle of view of 75%, an alternate long and short dash line indicates an interpolation/extrapolation curve at the angle of view of 50%, and an alternate long and two short dashes line indicates an interpolation/extrapolation curve at the angle of view of 25%.

Further, the control section 35 acquires a pixel shift amount in a currently-set pixel-shift super-resolution mode (the half-pixel-shift super-resolution mode, the one-third-pixel-shift super-resolution mode, etc.) and acquires a pixel opening ratio of the image pickup device 41 from the flash memory 33 and calculates a shift-amount determination frequency of the pixel-shift super-resolution (step S5).

Figure 23:
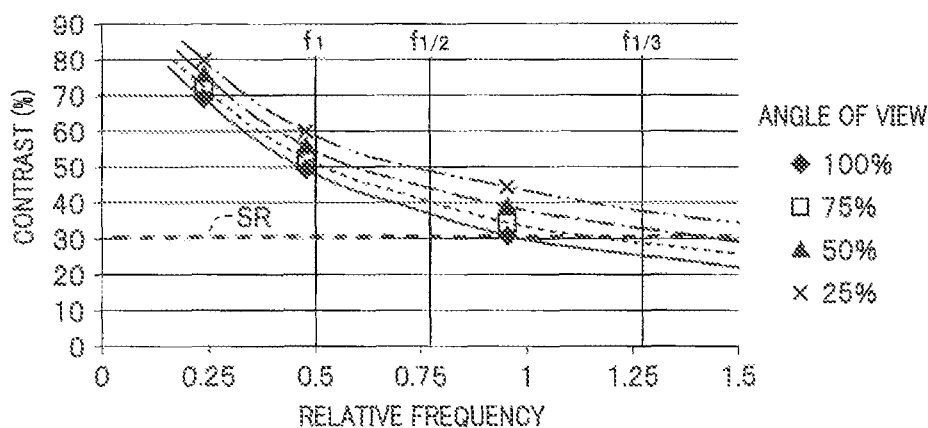
FIG. 23 is a graph showing the MTF characteristic values normalized by the sampling frequency and contrast limits in pixel-shift super-resolution in the first embodiment.

FIG. 23 is a graph showing the MTF characteristic values normalized by the sampling frequency and the contrast limits in the pixel-shift super-resolution. A horizontal axis in FIG. 23 also indicates the relative frequency normalized by the sampling frequency. In FIG. 23, a dotted line SR near contrast of 30% indicates a contrast limit of the pixel-shift super-resolution.

Further, in FIG. 23, f1 indicates a relative frequency in the one-pixel-shift super-resolution mode as the determination frequency, f1/2 indicates a relative frequency in the half-pixel-shift super-resolution mode as the determination frequency, and f1/3 indicates a relative frequency in the one-third-pixel-shift super-resolution mode as the determination frequency. The relative frequencies f1, f1/2, and f1/3 are determined according to a shift amount in the pixel-shift super-resolution mode and the pixel opening ratio of the image pickup device 41 (e.g., a basic value is determined according to the pixel-shift shift amount but the basic value is corrected according to the pixel opening ratio).

In the case of the digital zoom shown in FIG. 22, the contrast limit changes according to the magnification. However, in the case of the pixel-shift super-resolution shown in FIG. 23, even if the pixel-shift super-resolution mode (the one pixel shift, the half pixel shift, and the one third pixel shift) changes (even in the normal one-image photographing mode without pixel shift), the contrast limit does not change (therefore, the contrast limit SR shown in FIG. 23 can be considered a contrast limit in the normal one-image photographing).

Such contrast limit of the pixel-shift super-resolution is set in advance for the camera main body 2 and stored in the flash memory 33, for example, during manufacturing.

Note that the interpolation/extrapolation of the MTF characteristic value calculated in step S4 explained above is applied to FIG. 23 in the same manner. Line types of interpolation/extrapolation curves corresponding to the angles of view are the same as the line types shown in FIG. 22.

Subsequently, the control section 35 acquires the contrast limit SR of the pixel-shift super-resolution shown in FIG. 23 from the flash memory 33 and calculates a coordinate point, where the interpolated/extrapolated MTF characteristic value and the contrast limit SR cross, to thereby determine a selectable pixel-shift shift amount (step S6).

In FIG. 23, the relative frequency (one, two, or three of f1, f1/2, and f1/3) at which an MTF characteristic value at the angle of view of 100% is equal to or higher than the contrast limit SR corresponds to the pixel-shift shift amount selectable at the angle of view of 100%.

When a part of the angles of view are trimmed and recorded, the relative frequency (one, two, or three of f1, f1/2, and f1/3) at which an MTF characteristic value of a set angle of view among the angles of view of 25%, 50%, 75%, and 100% is equal to or higher than the contrast limit SR corresponds to the pixel-shift shift amount selectable at the angle of view.

Alternatively, an angle of view at which MTF characteristic values of the respective angles of view 25%, 50%, 75%, and 100% at the relative frequency (any one of f1, f1/2, and f1/3) corresponding to a selected pixel-shift super-resolution mode are equal to or higher than the contrast limit SR is an angle of view selectable in the pixel-shift super-resolution mode (i.e., it is possible to determine to which degree the trimming can be performed in the selected pixel-shift super-resolution mode).

Further, the contrast limits DZ1.3. DZ2, DZ4, and the like of the digital zoom shown in FIG. 22 are set in advance for the camera main body 2 and stored in the flash memory 33 or the like, for example, during manufacturing. Therefore, the control section 35 acquires the contrast limits DZ1.3, DZ2, DZ4, and the like of the digital zoom from the flash memory 33, compares lens MTFs at the determination frequencies (e.g., in the case of the digital zoom magnification of 2, fDZ2) and the contrast limits (similarly, in the case of the digital zoom magnification of 2, DZ2) corresponding to the respective digital zoom magnifications, and determines that a zoom magnification at which the lens MTF exceeds the contrast limit can be selected. In this way, the control section 35 determines a selectable digital zoom magnification according to the interchangeable lens 1 attached to the camera main body 2 (step S7).

The control section 35 controls the respective sections including the image pickup section 21 to thereby perform the live-view image pickup processing (step S8) and performs live-view display of images obtained in frame units in the live view on the back panel 29 or the EVF 28 (step S9).

FIG. 24 is a diagram showing a first display example of a digital zoom magnification selectable when the digital zoom mode is set and the live-view display is performed at a magnification of 1.0. FIG. 25 is a diagram showing a first display example of a selectable digital zoom magnification when the digital zoom mode is set and the live-view display is performed at a magnification of 1.3.

The examples shown in FIG. 24 and FIG. 25 are examples in which the selectable digital zoom magnification is displayed as a digital zoom frame and characters. That is, in the examples, a digital zoom frame on the full screen corresponding to a currently-selected magnification is indicated by a solid line rectangular frame. A digital zoom frame corresponding to selectable magnification in the solid line digital zoom frame (i.e., further on a high magnification side than the currently-selected magnification) is indicated by a dotted line rectangular frame. Magnifications corresponding to the respective digital zoom frames are indicated by characters.

More specifically, FIG. 24 shows a state in which the live-view display is performed at the digital zoom of the magnification of 1.0. A range of a currently-selected magnification of 1.0 (×1.0) is indicated by a solid line digital zoom frame. A dotted line digital zoom frame corresponding to a selectable magnification of 1.3 (×1.3) and a dotted line digital zoom frame corresponding to a selectable magnification of 2.0 (×2.0) are respectively shown.

Similarly, FIG. 25 shows a state in which the live-view display is performed at the digital zoom of the magnification of 1.3. A range of a currently-selected magnification of 1.3 is indicated by a solid line digital zoom frame. A dotted line digital zoom frame corresponding to a selectable magnification of 2.0 is further shown. Note that, in the example shown in FIG. 25, a dotted line digital zoom frame of corresponding to a selectable magnification of 1.0 is not displayed because the digital zoom frame is outside a display range.

In the examples shown in FIG. 24 and FIG. 25, since a magnification of 4.0 (×4.0) is not included in the selectable magnifications of the digital zoom determined in step S7, a dotted line digital zoom frame corresponding to the magnification of 4.0 is not displayed.

Figure 26:
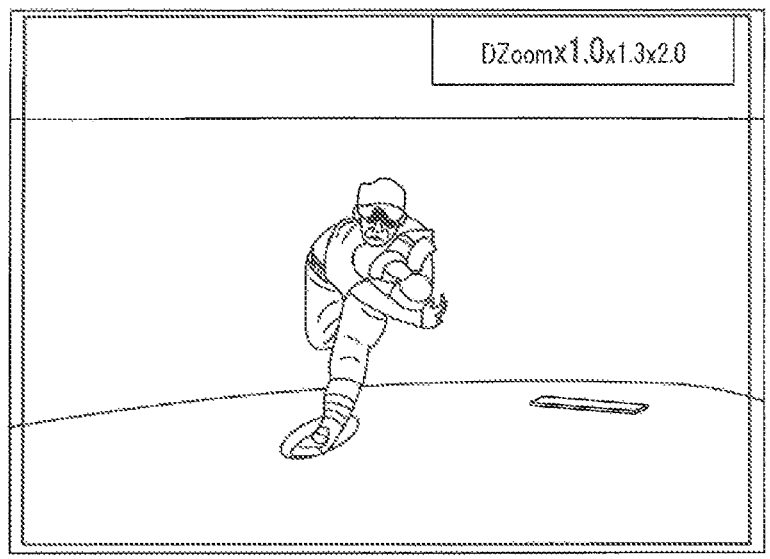
FIG. 26 is a diagram showing a second display example of the digital zoom magnifications selectable when the digital zoom mode is set and the live-view display is performed at the magnification of 1.0.
Figure 27:
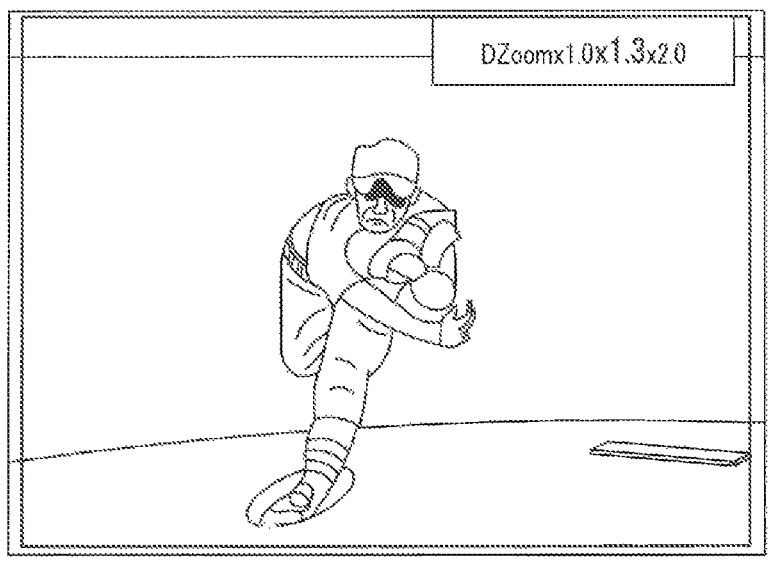
FIG. 27 is a diagram showing a second display example of the digital zoom magnifications selectable when the digital zoom mode is set and the live-view display is performed at the magnification of 1.3.

FIG. 26 is a diagram showing a second display example of a digital zoom magnification selectable when the digital zoom mode is set and the live-view display is performed at the magnification of 1.0. FIG. 27 is a diagram showing a second display example of a digital zoom magnification selectable when the digital zoom mode is set and the live-view display is performed at the magnification of 1.3.

The examples shown in FIG. 26 and FIG. 27 are examples in which selectable digital zoom magnifications are displayed side by side as characters. That is, in the examples, the selectable magnifications are displayed side by side as characters and a currently-selected magnification (×1.0 in FIG. 26 and ×1.3 in FIG. 27) is displayed as characters in larger size than magnifications not currently selected. Characters of "DZoom" indicating that the photographing mode is the digital zoom mode are also displayed.

Note that, although the character size of the currently-selected magnification is set large, instead of or in addition to this, the currently-selected magnification may be displayed as thick characters, a character color of the currently-selected magnification may be differentiated, a font of the currently-selected magnification may be differentiated, or a character decoration such as shaded characters of the currently-selected magnification may be differentiated.

Subsequently, the control section 35 determines which of the digital zoom mode and the pixel-shift super-resolution mode a currently-set photographing mode is (step S10).

Upon determining that the currently-set photographing mode is the pixel-shift super-resolution mode, the control section 35 superimposes and displays a selectable trimming frame and a selectable shift amount on the live-view image (step S11).

Figure 28:
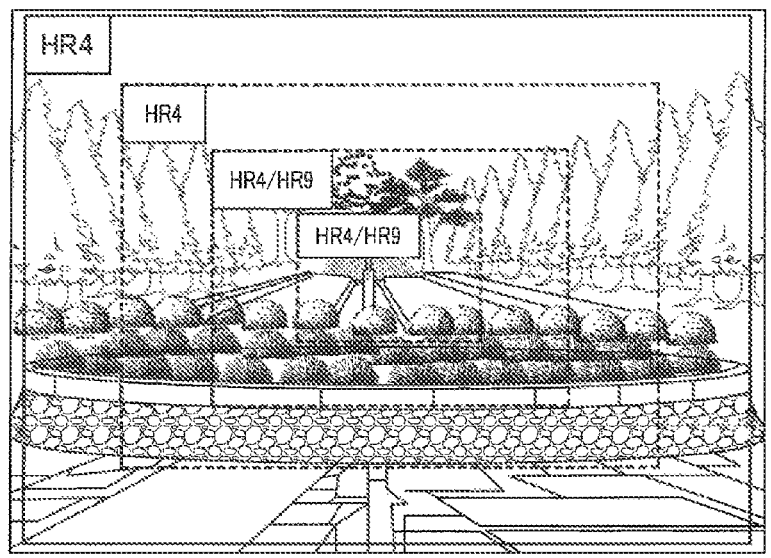
FIG. 28 is a diagram showing a display example of trimming frames and shift amounts selectable when the live-view display is performed at an angle of view of 100%, a pixel-shift super-resolution mode is set, and the half-pixel-shift super-resolution mode is selected at the angle of view of 100%.
Figure 29:
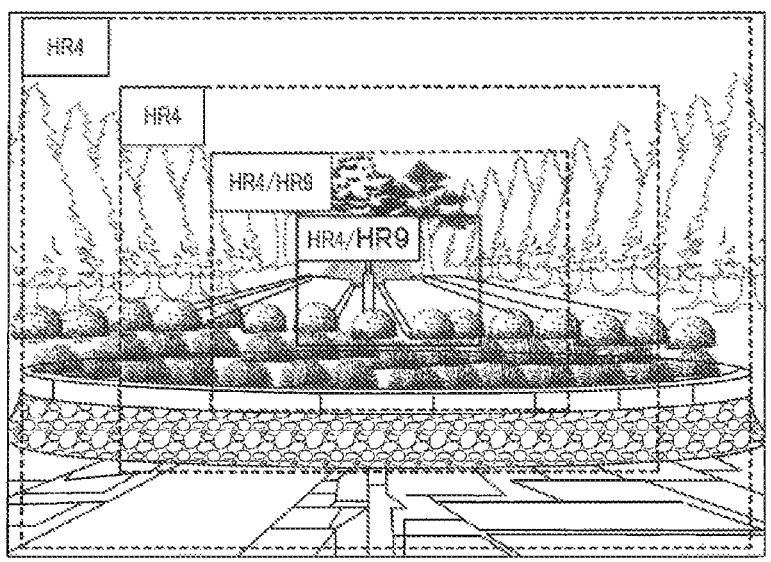
FIG. 29 is a diagram showing a display example of trimming frames and shift amounts selectable when the live-view display is performed at the angle of view of 100%, the pixel-shift super-resolution mode is set, and the one-third-pixel-shift super-resolution mode is selected at an angle of view of 25%.

FIG. 28 is a diagram showing a display example of trimming frames and shift amounts selectable when the live-view display is performed at the angle of view of 100%, the pixel-shift super-resolution mode is set, and the half-pixel-shift super-resolution mode is selected at the angle of view of 100%. FIG. 29 is a diagram showing a display example of trimming frames and shift amounts selectable when the live-view display is performed at the angle of view of 100%, the pixel-shift super-resolution mode is set, and the one-third-pixel-shift super-resolution mode is selected at the angle of view of 25%.

In the examples shown in FIG. 28 and FIG. 29, trimming frames are prepared in advance respectively according to a plurality of trimming angles of view (100%, 75%, 50%, and 25%). Selectable trimming angles of view are displayed on the screen and pixel-shift super-resolution modes selectable when the trimming angles of view indicated by the trimming frames are set are displayed by characters. More specifically, a trimming frame corresponding to a currently-selected angle of view (not an angle of view during the live view but an angle of view selected for still image photographing) is indicated by a solid line rectangular frame. Other trimming frames corresponding to angles of view selectable and displayable on the screen are indicated by dotted line rectangular frames. Pixel-shift super-resolution modes that can be set when images of the angles of view corresponding to the respective trimming frames are obtained are indicated by characters.

At this time, characters indicating a currently-selected pixel-shift super-resolution mode among characters indicating the pixel-shift super-resolution modes incidental to the trimming frame corresponding to the currently-selected angle of view are displayed as characters having size larger than characters indicating pixel-shift super-resolution modes not currently selected. Note that the currently-selected pixel-shift super-resolution mode is not distinguished only by changing the character size, which is similar to what was explained above.

In FIG. 28 and FIG. 29 (further, in FIG. 30 and FIG. 31 referred to below), longitudinally twice and horizontally twice (four times in total) as high resolution is achieved by the half-pixel-shift super-resolution mode (a shift amount of ½). Therefore, the half-pixel-shift super-resolution mode is indicated by characters of "HR4". Longitudinally three times and horizontally three times (nine times in total) as high resolution is achieved by the one-third-pixel-shift super-resolution mode (a shift amount of ⅓). Therefore, the one-third-pixel-shift super-resolution mode is indicated by characters "HR9".

HR4 can be selected at the angle of view of 100%, HR4 can be selected at the angle of view of 75%, HR4 or HR9 can be selected at the angle of view of 50%, and HR4 or HR9 can be selected at the angle of view of 25%. Therefore, the user can select either one of HR4 and HR9 as desired at the angle of view of 50% or the angle of view of 25%. However, the photographing mode is automatically set to the half-pixel-shift super-resolution mode (HR4) at the angle of view of 100% and the angle of view of 75%.

Figure 30:
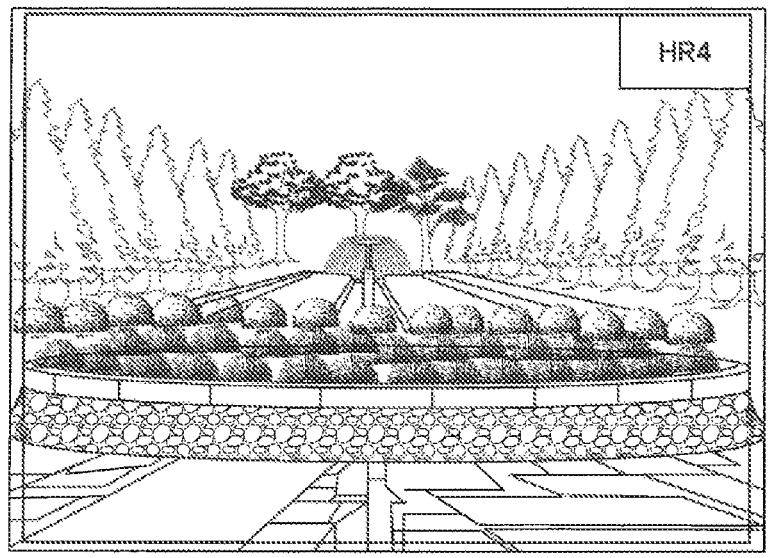
FIG. 30 is a diagram showing a display example of trimming frames and shift amounts at the time when the live-view display is performed at the angle of view of 100%, the pixel-shift super-resolution mode is set, and the half-pixel-shift super-resolution mode is selected at the angle of view of 100%.

FIG. 30 is a diagram showing a display example of trimming frames and shift amounts at the time when the live-view display is performed at the angle of view of 100%, the pixel-shift super-resolution mode is set, and the half-pixel-shift super-resolution mode is selected at the angle of view of 100%. FIG. 31 is a diagram showing a display example of trimming frames and shift amounts at the time when the live-view display is performed at the angle of view of 25%, the pixel-shift super-resolution mode is set, and the one-third-pixel-shift super-resolution mode is selected at the angle of view of 25%.

In the examples shown in FIG. 30 and FIG. 31, since a trimming angle of view at the time when the live view is performed is an angle of view selected for still image photographing, a solid line trimming frame is shown at the peripheral edge of the screen (on the full screen). Further, in the example shown in FIG. 30, it is displayed that the half-pixel-shift super-resolution mode (HR4) is selected as the pixel-shift super-resolution mode. In the example shown in FIG. 31, although the half-pixel-shift super-resolution mode (HR4) and the one-third-pixel-shift super-resolution mode (HR9) can be selected as the pixel-shift super-resolution mode, it is displayed by characters of large size that the one-third-pixel-shift super-resolution mode (HR9) is currently selected.

Subsequently, the control section 35 determines whether an instruction for changing the pixel-shift shift amount (i.e., the pixel-shift super-resolution mode) is performed by the user via the operation section 32 (step S12).

Upon determining that the instruction for changing the shift amount is performed, if the change of the shift amount involves a change of a trimming angle of view, the control section 35 changes an angle of view of a displayed image (step S13). However, the change of the shift amount does not involve a change of the trimming angle of view, the angle of view of the displayed image is maintained.

Further, the control section 35 changes trimming frame display including a character portion according to the shift amount (step S14).

The control section 35 sets the pixel-shift super-resolution mode corresponding to the instruction to change the shift amount (step S15).

Upon performing the processing in step S15 or determining in step S12 that the instruction for changing the shift amount is not performed, the control section 35 determines whether a release button of the operation section 32 is pressed (step S16).

Upon determining that the release button is not pressed, the control section 35 returns to step S10 and performs the processing explained above.

Upon determining in step S16 that the release button is pressed, the AF detecting wave section 47 detects a contrast evaluation value on the basis of the image acquired in the live view, the control section 35 performs contrast AF processing on the basis of the contrast evaluation value, the AE/white balance section 48 performs white balance processing and detects an AE evaluation value, and the control section 35 performs AE processing on the basis of the AE evaluation value (step S17).

Subsequently, the control section 35 controls the image pickup section 21 and the sensor shift unit 22, while differentiating relative positions of an optical image formed by the lens 11 and the image pickup device 41 according to the set pixel-shift super-resolution mode, causes the image pickup section 21 to perform image pickup a plurality of times, and acquires a plurality of image data (step S18).

The super-resolution synthesizing section 26 generates super-resolution image data on the basis of the control by the control section 35 and on the basis of the acquired plurality of image data (step S19). Note that, by performing synthesis processing for super-resolution image data only on image data in a selected trimming angle of view, it is possible to increase the speed of the synthesis processing.

Thereafter, the image processing section 27 performs the image processing on the super-resolution image data on the basis of the control by the control section 35 (step S20).

On the other hand, when it is determined in step S10 that the currently-set photographing mode is the digital zoom mode, for example, a digital zoom frame corresponding to the selectable digital zoom magnification determined in step S7 is superimposed on the live-view image by the image processing section 27 and displayed on the back panel 29 or the EVF 28 (step S21). Therefore, digital zoom frames corresponding to unselectable digital zoom magnifications are not displayed.

Further, the control section 35 determines whether an instruction for changing the digital zoom magnification is performed by the user via the operation section 32 (step S22).

Upon determining that the instruction for changing the digital zoom magnification is performed, the control section 35 changes the magnification of the displayed image (step S23).

Further, the control section 35 changes the digital zoom frame display including the character portion according to the set magnification (step S24).

Upon performing the processing in step S24 or determining in step S22 that the instruction for changing the digital zoom magnification is not performed, the control section 35 determines whether the release button of the operation section 32 is pressed (step S25).

Upon determining that the release button is not pressed, the control section 35 returns to step S10 and performs the processing explained above.

Upon determining in step S25 that the release button is pressed, as in step S17 explained above, the control section 35 performs the AE processing, the AF processing, and the white balance processing (step S26).

Subsequently, the control section 35 controls the image pickup section 21 to perform image pickup and acquires image data (step S27).

Thereafter, the image processing section 27 performs the image processing on the image data on the basis of the control by the control section 35 (step S28).

Further, the resizing section 68 performs image enlargement processing, that is, electronic zoom processing on the basis of the control by the control section 35 (step S29).

When the processing in step S20 or step S29 is performed in this way, the image data after the image processing is recorded in the external memory 30 as an image file on the basis of the control by the control section 35 (step S30). At this time, in order to confirm a photographed image, photographed image data may be displayed on the EVF 28 or the back panel 29 for a predetermined time.

The control section 35 performs the live-view display again (step S31).

Upon performing the live-view display, the control section 35 monitors an operation input from the operation section 32 and determines whether the mode is changed to another mode, which is neither the pixel-shift super-resolution mode nor the digital zoom mode, for example, the normal one-image photographing mode, the moving image photographing mode, or the reproduction mode (step S32).

Upon determining that the mode is not changed to another mode, the control section 35 returns to step S10 and performs the processing explained above.

Upon determining in step S32 that the mode is changed to another mode, the control section 35 returns from the processing to the not-shown main processing.

Note that, in the above explanation, the resolution changing section (the super-resolution synthesizing section 26 and the resizing section 68) that generates, on the basis of the picked-up image data obtained from the image pickup section 21, image data having resolution higher than the resolution of the picked-up image data and the control section 35 that determines, on the basis of the plurality of MTF characteristic values received by the interface (I/F) 31, which is the receiving section, and the predetermined sampling frequency, an upper limit of the resolution of the image data generated by the resolution changing section are provided in the camera main body 2. However, the configuration as such is not limited to this. For example, the resolution changing section and the control section may be provided in an image processing apparatus separate from the image pickup system. The image pickup system may cause a computer to execute an image processing program to perform processing equivalent to the processing of the resolution changing section and the control section. In this case, the picked-up image data obtained from the image pickup system explained above only has to be inputted to the image processing apparatus, the computer, or the like to perform the processing in the apparatuses.

In the above explanation, the plurality of MTF characteristic values are received from the interchangeable lens 1. However, a plurality of sets of MTF characteristic values corresponding to a plurality of types of the interchangeable lens 1 (a set of MTF characteristic values formed by a plurality of MTF characteristic values corresponding to the plurality of regions in the screen is present with respect to one type of the interchangeable lens 1) may be prepared in advance as design values and stored in the storing section in the camera main body 2. A set of MTF characteristic values may be read out from the storing section according to a type of the attached interchangeable lens 1.

Further, a set of MTF characteristic values corresponding to a type of the interchangeable lens 1 transmitted from an external device or the like (the interchangeable lens 1 is also one kind of the external device) of the camera main body 2 by a wired or wireless communication line may be received by the receiving section of the camera main body 2 and used. As one specific example, as explained above, the camera main body 2 receives the set of MTF characteristic values from the interchangeable lens 1 via the interfaces (I/F) 15 and 31. As another specific example, the camera main body 2 may transmit a type of the attached interchangeable lens 1 (in general, information concerning the type of the interchangeable lens 1 is recorded in the ROM 16 of the interchangeable lens 1 and, when the interchangeable lens 1 is connected, acquired by the control section 35 of the camera main body 2) to a server via the Internet or the like and make a request to thereby receive the set of MTF characteristic values corresponding to the type of the interchangeable lens 1 from the server.

In the above explanation, the ROM 16 provided in the interchangeable lens 1 is explained as the storing section that stores the plurality of MTF characteristic values corresponding to the plurality of regions in the screen. However, the storing section is not limited to this. As the storing section provided in the camera main body 2 and configured to store the plurality of MTF characteristic values in advance, for example, a temporary storage circuit such as the DRAM 25, a nonvolatile memory such as the flash memory 33, a register for operation provided on an inside of, for example, a CPU or an ASIC configuring the control section 35, or the like may be used. In the case, a plurality of sets of MTF characteristic values formed by pluralities of MTF characteristic values are stored in the storing section in advance. The camera main body 2 only has to select a set of MTF characteristic values stored in the storing section according to a type of the attached interchangeable lens 1.

According to the first embodiment explained above, the upper limit of the resolution of the image data generated by the resolution changing section is determined on the basis of the plurality of MTF characteristic values corresponding to the plurality of regions of the interchangeable lens 1 and the predetermined sampling frequency. The image data having resolution higher than the resolution of the picked-up image data is generated. Therefore, it is possible to appropriately set resolution improvement of an image according to the resolving power of the interchangeable lens 1.

When the camera main body 2 includes the receiving section configured to receive the plurality of MTF characteristic values from an outside of the camera main body 2, an advantage exists that the camera main body 2 does not need to store the MTF characteristic values of the interchangeable lens 1 in advance.

Further, when the plurality of MTF characteristic values corresponding to the plurality of regions are stored in the ROM 16 of the interchangeable lens 1, simply by attaching the interchangeable lens 1, it is possible to easily acquire the MTF characteristic values with the interface (I/F) 31, which is the receiving section.

When the storing section configured to store the plurality of MTF characteristic values in advance is provided in the camera main body 2, it is also possible to adapt the camera main body 2 to the interchangeable lens 1 not storing the plurality of MTF characteristic values corresponding to the plurality of regions (e.g., the interchangeable lens 1 not storing the MTF characteristic values or the interchangeable lens 1 configured to store only an average MTF characteristic value of the entire screen or an MTF characteristic value of a representative one point in the entire screen).

The upper limit enlargement magnification of the enlarged image data generated by the resizing section 68 is determined on the basis of the MTF characteristic value corresponding to the partial region among the plurality of MTF characteristic values and the predetermined sampling frequency. Therefore, it is possible to select an appropriate enlargement magnification. It is possible to prevent an excessively large enlargement magnification, with which improvement of resolution cannot be expected in the attached interchangeable lens 1, from being selected.

Further, the pixel-shift super-resolution mode is determined on the basis of the plurality of MTF characteristic values and the predetermined sampling frequency. Therefore, it is possible to select an appropriate pixel-shift super-resolution mode. It is possible to prevent a pixel-shift super-resolution mode having an excessively small shift amount, with which improvement of resolution cannot be expected in the attached interchangeable lens 1, from being selected.

In addition, the pixel mixing section 44 can change the predetermined sampling frequency of the picked-up image data by changing the number of mixed pixels of the pixel mixing. Therefore, it is possible to appropriately reduce a readout time period from the image pickup section 21 according to a use such as live view or moving image photographing.

When the upper limit value of the predetermined sampling frequency is determined on the basis of the plurality of MTF characteristic values, if improvement of resolution cannot be expected in the currently-attached interchangeable lens 1 even if all the pixels of the image pickup device 41 are read out, it is possible to appropriately reduce a readout time period of the picked-up image data from the image pickup section 21.

Note that the respective sections explained above may be configured as circuits. Any circuit may be implemented as a single circuit or may be implemented as a combination of a plurality of circuits as long as the circuit can play the same function. Further, any circuit is not limited to be configured as a dedicated circuit for playing a target function and may be configured to play the target function by causing a general-purpose circuit to execute a processing program.

In the above explanation, the image pickup system is mainly explained. However, an aspect of the present invention may be a method (an image pickup method, an image processing method, etc.) of performing the same processing as the processing of the image pickup system or may be a processing program for causing a computer to perform the same processing as the processing of the image pickup system, a non-transitory computer-readable recording medium storing the processing program, and the like.

The present invention is not limited to the embodiment explained above per se. In an implementation stage, the constituent elements can be modified and embodied in a range not departing from the spirit of the present invention. Aspects of various inventions can be formed by appropriate combinations of the plurality of constituent elements disclosed in the embodiment. For example, several constituent elements may be deleted from all the constituent elements described in the embodiment. Further, the constituent elements described in different embodiments may be combined as appropriate. In this way, it goes without saying that various modifications and applications are possible in a range not departing from the spirit of the invention.

What is claimed is:

1. An image pickup system in which an interchangeable lens is detachably attached to a camera main body, the image pickup system comprising:
    an image pickup circuit provided in the camera main body and configured to pick up, on an image pickup plane on which a plurality of pixels are arrayed, an optical image formed by the interchangeable lens and output picked-up image data with a predetermined sampling frequency;
    a resolution changing circuit configured to generate, on the basis of the picked-up image data corresponding to a partial region in a screen obtained from the image pickup circuit, image data with resolution higher than resolution of the picked-up image data; and
    a control circuit configured to determine, on the basis of an MTF characteristic value corresponding to the partial region among a plurality of MTF characteristic values corresponding to a plurality of regions in the screen of the interchangeable lens and the predetermined sampling frequency, an upper limit of the resolution of the image data generated by the resolution changing circuit.

2. The image pickup system according to claim 1, further comprising a receiving circuit provided in the camera main body and configured to receive the plurality of MTF characteristic values from an outside of the camera main body.

3. The image pickup system according to claim 2, further comprising a storing circuit provided in the interchangeable lens and configured to store the plurality of MTF characteristic values, wherein
    the receiving circuit further receives the plurality of MTF characteristic values from the interchangeable lens.

4. The image pickup system according to claim 1, further comprising a storing circuit provided in the camera main body and configured to store the plurality of MTF characteristic values in advance.

5. The image pickup system according to claim 1, wherein
    the resolution changing circuit includes an image enlarging circuit configured to interpolate pixels of the picked-up image data and generate enlarged image data, and
    the control circuit further determines an upper limit enlargement magnification of the enlarged image data on the basis of the MTF characteristic value corresponding to the partial region among the plurality of MTF characteristic values and the predetermined sampling frequency.

6. The image pickup system according to claim 1, further comprising a pixel shifting circuit configured to perform pixel shift for shifting relative positions of the optical image and the image pickup circuit, the pixel shifting circuit being able to be set in a plurality of pixel-shift super-resolution modes including different shift amounts, wherein
    the control circuit further causes the image pickup circuit to perform image pickup a plurality of times and acquire a plurality of picked-up image data in which the relative positions are different while setting the pixel shifting circuit in a certain pixel-shift high-resolution mode and causing the pixel shifting circuit to perform the pixel shift,
    the resolution changing circuit includes a super-resolution synthesizing circuit configured to synthesize super-resolution image data with resolution higher than resolution of one piece of the picked-up image data from the plurality of picked-up image data corresponding to the partial region in the screen, and the control circuit further determines a pixel-shift super-resolution mode corresponding to the upper limit of the resolution on the basis of the MTF characteristic value corresponding to the partial region among the plurality of MTF characteristic values and the predetermined sampling frequency.

7. The image pickup system according to claim 1, wherein the image pickup circuit includes a pixel mixing circuit configured to perform pixel mixing to be able to change a number of mixed pixels, the image pickup circuit being able to change the predetermined sampling frequency of the picked-up image data by changing the number of mixed pixels.

8. The image pickup system according to claim 7, wherein the control circuit further determines an upper limit value of the predetermined sampling frequency on the basis of the plurality of MTF characteristic values.

9. An image processing method for processing picked-up image data obtained from an image pickup system, in which an interchangeable lens is detachably attached to a camera main body, including an image pickup circuit configured to pick up, on an image pickup plane on which a plurality of pixels are arrayed, an optical image formed by the interchangeable lens and output the picked-up image data with a predetermined sampling frequency, the image processing method comprising:

a resolution changing step for generating, on the basis of the picked-up image data corresponding to a partial region in a screen, image data with resolution higher than resolution of the picked-up image data; and a control step for determining, on the basis of an MTF characteristic value corresponding to the partial region among a plurality of MTF characteristic values corresponding to a plurality of regions in the screen of the interchangeable lens and the predetermined sampling frequency, an upper limit of the resolution of the image data generated by the resolution changing step.

10. A non-transitory computer-readable medium storing an image processing program for causing a computer to process picked-up image data obtained from an image pickup system, in which an interchangeable lens is detachably attached to a camera main body, including an image pickup circuit configured to pick up, on an image pickup plane on which a plurality of pixels are arrayed, an optical image formed by the interchangeable lens and output the picked-up image data with a predetermined sampling frequency, the image processing program comprising:

a resolution changing step for generating, on the basis of the picked-up image data corresponding to a partial region in a screen, image data with resolution higher than resolution of the picked-up image data; and a control step for determining, on the basis of an MTF characteristic value corresponding to the partial region among a plurality of MTF characteristic values corresponding to a plurality of regions in the screen of the interchangeable lens and the predetermined sampling frequency, an upper limit of the resolution of the image data generated by the resolution changing step.

* * * * *